US009674168B2

(12) United States Patent
Kottahachchi et al.

(10) Patent No.: US 9,674,168 B2

(45) Date of Patent: Jun. 6, 2017

(54) PRIVILEGED ACCOUNT PLUG-IN FRAMEWORK-STEP-UP VALIDATION

(71) Applicant: Oracle International Corporation, Redwood Shores, CA (US)

(72) Inventors: Buddhika Kottahachchi, San Mateo, CA (US); Himanshu Sharma, San Mateo, CA (US); Ramaprakash Hosalli Sathyanarayan, Cupertino, CA (US); Fannie Ho, Fremont, CA (US); Arun Theebaprakasam, Fremont, CA (US); Kwan-I Lee, San Mateo, CA (US); Zhe Wang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 20 days.

(21) Appl. No.: 14/221,203

(22) Filed: Mar. 20, 2014

(65) Prior Publication Data

US 2015/0082372 A1 Mar. 19, 2015

Related U.S. Application Data

(60) Provisional application No. 61/879,800, filed on Sep. 19, 2013.

(51) Int. Cl.
*H04L 29/06* (2006.01)

(52) U.S. Cl.
CPC ............ *H04L 63/08* (2013.01); *H04L 63/083* (2013.01); *H04L 63/102* (2013.01)

(58) Field of Classification Search
CPC ..... H04L 63/00; H04L 63/04; H04L 63/0407; H04L 63/0414; H04L 63/0421;
(Continued)

(56) References Cited

U.S. PATENT DOCUMENTS

| | | | |
|---|---|---|---|
| 6,141,778 | A | 10/2000 | Kane et al. |
| 6,516,416 | B2 | 2/2003 | Gregg et al. |

(Continued)

OTHER PUBLICATIONS

U.S. Appl. No. 14/221,217, filed Mar. 20, 2014, Titled: Privileged Account Plug-In Framework—Usage Policies.

(Continued)

*Primary Examiner* — Jung Kim
*Assistant Examiner* — Adrian Stoica
(74) *Attorney, Agent, or Firm* — Kilpatrick Townsend & Stockton LLP

(57) ABSTRACT

Techniques for managing privileged accounts via a privileged access management service are provided. In some examples, the service may be configured with a plug-in framework for accessing secure resources. In some aspects, plug-in code for implementing a workflow that includes step-up validation associated with a user attempting to access at least one secure resource may be received. Access to the at least one secure resource may be provided when the user is authenticated with respect to the service. In some examples, a request to access a second secure resource may be received. Additionally, in some examples, the workflow to perform the step-up validation may be implemented at least in response to the request to access the second secure resource. The workflow implemented based at least in part on an attribute associated with the request.

11 Claims, 16 Drawing Sheets

(58) Field of Classification Search

CPC ... H04L 63/08; H04L 63/0815; H04L 63/083; H04L 63/0838; H04L 63/0846; H04L 63/0876; H04L 63/0884; H04L 63/10; H04L 63/102; H04L 63/107; H04L 63/108; H04L 63/1441; H04L 63/1483; G06F 21/00; G06F 21/30; G06F 21/31; G06F 21/313; G06F 21/41; G06F 21/42

See application file for complete search history.

(56) References Cited

U.S. PATENT DOCUMENTS 6,754,702 B1 6/2004 Kennelly et al.
7,073,129 B1 7/2006 Robarts et al.
7,290,288 B2 10/2007 Gregg et al.
7,581,245 B2 8/2009 Rojewski
8,266,682 B2 9/2012 Lee
8,997,240 B1* 3/2015 Kohen et al. .................. 726/26
9,069,947 B2 6/2015 Kottahachchi et al.
9,129,105 B2 9/2015 Donley et al.
9,152,783 B2 10/2015 Kottahachchi et al.
9,390,255 B2 7/2016 Sharma et al.
2002/0095395 A1 7/2002 Larson et al.
2002/0188869 A1 12/2002 Patrick
2003/0056026 A1 3/2003 Anuff et al.
2003/0101360 A1 5/2003 Legros et al.
2003/0145074 A1 7/2003 Penick
2004/0064742 A1 4/2004 Excoffier et al.
2004/0133876 A1 7/2004 Sproule
2004/0215610 A1 10/2004 Dixon et al.
2007/0028258 A1* 2/2007 Wollmershauser .... G06Q 30/06 725/29
2007/0055602 A1 3/2007 Mohn
2007/0180504 A1 8/2007 Hung et al.
2007/0282942 A1 12/2007 Bailey et al.
2008/0027788 A1 1/2008 Lawrence et al.
2008/0059804 A1 3/2008 Shah et al.
2008/0209213 A1 8/2008 Astrand et al.
2008/0250332 A1 10/2008 Farrell et al.
2008/0263652 A1* 10/2008 McMurtry ........... G06F 21/335 726/9
2008/0275851 A1 11/2008 Taylor et al.
2008/0301460 A1* 12/2008 Miller et al. .................. 713/183
2009/0125989 A1 5/2009 Flaherty et al.
2009/0144183 A1 6/2009 Gatchell et al.
2009/0240728 A1 9/2009 Shukla et al.
2009/0276839 A1* 11/2009 Peneder .................. G06F 21/40 726/8
2010/0131654 A1 5/2010 Malakapalli et al.
2010/0145718 A1 6/2010 Elmore et al.
2010/0325687 A1 12/2010 Iverson et al.
2010/0325705 A1 12/2010 Iverson et al.
2010/0325707 A1 12/2010 Iverson et al.
2011/0023107 A1 1/2011 Chen et al.
2011/0040793 A1 2/2011 Davidson et al.
2011/0053555 A1 3/2011 Cai et al.
2011/0083163 A1 4/2011 Auvenshine et al.
2011/0087766 A1 4/2011 Kuo et al.
2011/0106835 A1 5/2011 Lauridsen et al.
2011/0112939 A1 5/2011 Nelson et al.
2011/0113471 A1 5/2011 Hjelm et al.
2011/0154464 A1 6/2011 Agarwal et al.
2011/0185403 A1 7/2011 Dolan et al.
2011/0209200 A2* 8/2011 Mr. White et al. ............... 726/4
2011/0213789 A1 9/2011 Doshi et al.
2011/0247059 A1 10/2011 Anderson et al.
2011/0265160 A1 10/2011 Nettleton
2011/0296001 A1 12/2011 Ramstrom
2011/0307957 A1 12/2011 Barcelo et al.
2012/0023546 A1 1/2012 Kartha et al.
2012/0266156 A1 10/2012 Spivak et al.
2012/0324529 A1 12/2012 Rangachari et al.
2013/0086060 A1 4/2013 Donley et al.
2013/0086065 A1 4/2013 Sharma et al.
2013/0086628 A1 4/2013 Kottahachchi et al.
2013/0086658 A1 4/2013 Kottahachchi et al.
2013/0111565 A1 5/2013 Wen et al.
2013/0125211 A1 5/2013 Cashman et al.
2013/0276078 A1* 10/2013 Rockwell .......................... 726/7
2013/0340030 A1 12/2013 Riley et al.
2013/0347129 A1* 12/2013 Samuelsson ............ H04L 9/321 726/28
2014/0115718 A1 4/2014 Kellerman et al.
2014/0137219 A1* 5/2014 Castro et al. ..................... 726/6
2014/0189808 A1* 7/2014 Mahaffey et al. ................ 726/4
2014/0189829 A1* 7/2014 McLachlan et al. ............. 726/6
2014/0196104 A1 7/2014 Chari et al.
2014/0380444 A1* 12/2014 Kelley .............................. 726/7
2015/0026796 A1* 1/2015 Alan et al. ...................... 726/19
2015/0199213 A1 7/2015 Desai et al.
2015/0200943 A1 7/2015 Pitre
2016/0315970 A1 10/2016 Sharma et al.

OTHER PUBLICATIONS

U.S. Appl. No. 14/221,209, filed Mar. 20, 2014, Titled: Privileged Account Plug-In Framework—Network-Connected Objects.

U.S. Appl. No. 14/221,209 , "Non-Final Office Action", mailed Jul. 31, 2015, 14 pages.

Final Office Action mailed Dec. 10, 2015 in related U.S. Appl. No. 14/221,209, 15 pgs.

U.S. Appl. No. 14/221,209 , "Non-Final Office Action", Mar. 21, 2016, 17 pages.

U.S. Appl. No. 14/221,217 , "Non-Final Office Action", Mar. 25, 2016, 9 pages.

U.S. Appl. No. 14/221,209, "Final Office Action", Aug. 23, 2016, 20 pages.

"2 Oracle Identity Manager User Profile Auditing", Oracle Identity Manager Audit Report Developer's Guide Release 9.0, Part No. 832137-01, Retrieved from the Internet: <URL: http://docs.oracle.com/cd/B32386_01/generic.902/b32137/useraudit.htm>, 2006, 9 pages.

"Oracle Identity Manager-11 g Release 2 (11.1.2.2)", Fusion Middleware Identity Management Release Notes 11g Release 2, Part No. E39887-14, Retrieved from the Internet: <URL: http://docs.oracle.com/cd/E40329_01/relnotes.1112/e39887/id_mgr.htm>, 2014, 34 pages.

"Register and Mapping definitions in Webster's Third New International Dictionary", Merriam-Webster Inc., 2001, 3 pages.

"User definition in Dictionary of Information Security", Syngress Publishing Inc., 2006, 2 pages.

"What's New in Oracle Identity Manager 11g R2 PS2", Retrieved from the Internet: <URL: oim-11gr2-whatsnew-1709505.pdf>, 2014, 2 pages.

U.S. Appl. No. 13/485,255, "Final Office Action" mailed Aug. 25, 2014, 20 pages.

U.S. Appl. No. 13/485,255, "Non-Final Office Action" mailed Dec. 19, 2013, 26 pages.

U.S. Appl. No. 13/485,327, "Final Office Action" mailed Oct. 22, 2014, 14 pages.

U.S. Appl. No. 13/485,327, "Non-Final Office Action" mailed Feb. 4, 2014, 22 pages.

U.S. Appl. No. 13/485,327, "Notice of Allowance" mailed Apr. 15, 2015, 11 pages.

U.S. Appl. No. 13/485,372, "Final Office Action" mailed Sep. 9, 2013, 16 pages.

U.S. Appl. No. 13/485,372, "Final Office Action" mailed Jan. 21, 2015, 18 pages.

U.S. Appl. No. 13/485,372, "Non-Final Office Action" mailed Feb. 28, 2013, 14 pages.

U.S. Appl. No. 13/485,372, "Non-Final Office Action" mailed Jul. 2, 2014, 15 pages.

U.S. Appl. No. 13/485,372, "Notice of Allowance", May 4, 2015, 10 pages.

U.S. Appl. No. 13/485,408, "Final Office Action" mailed Nov. 4, 2015, 9 pages.

U.S. Appl. No. 13/485,408, "Notice of Allowance" mailed Mar. 29, 2016, 16 pages.

(56) References Cited

OTHER PUBLICATIONS

U.S. Appl. No. 14/221,217, "Final Office Action" mailed Oct. 20, 2016, 10 pages.
U.S. Appl. No. 14/594,690, "Non-Final Office Action" mailed Jul. 18, 2016, 19 pages.
U.S. Appl. No. 14/594,690, "Notice of Allowance" mailed Nov. 3, 2016, 5 pages.

* cited by examiner

300

PRIVILEGED ACCOUNT PLUG-IN FRAMEWORK-STEP-UP VALIDATION

CROSS-REFERENCE TO RELATED APPLICATIONS

The present application is a non-provisional of and claims the benefit and priority under 35 U.S.C. 119(e) of U.S. Provisional Application No. 61/879,800 filed Sep. 19, 2013 entitled PLUG-IN FRAMEWORK FOR PRIVILEGED ACCOUNT MANAGEMENT SERVICE, the entire contents of which is incorporated herein by reference for all purposes.

The present application is also related to U.S. Non-Provisional application Ser. No. 14/221,209, entitled PRIVILEGED ACCOUNT PLUG-IN FRAMEWORK-NETWORK-CONNECTED OBJECTS and U.S. Non-Provisional application Ser. No. 14/221,217, entitled PRIVILEGED ACCOUNT PLUG-IN FRAMEWORK - USAGE POLICIES, each filed on the same day herewith, the entire contents of each hereby incorporated by reference as if fully set forth herein, under 35 U.S.C. §120.

BACKGROUND

Modern computing systems often utilize multiple privileged accounts for providing secure access to computing resources. Additionally, multiple different types of privileged accounts may be implemented by a single system to provide different roles and/or levels of access associated with such resources. For example, a user account may be provided different rights from an administrative account. With a wide variety of account types and/or roles, it can become burdensome to manage credentials and/or security for the multitude of accounts. As such, finding improved ways to manage privileged accounts continues to be a priority.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

BRIEF SUMMARY

Figure 1:
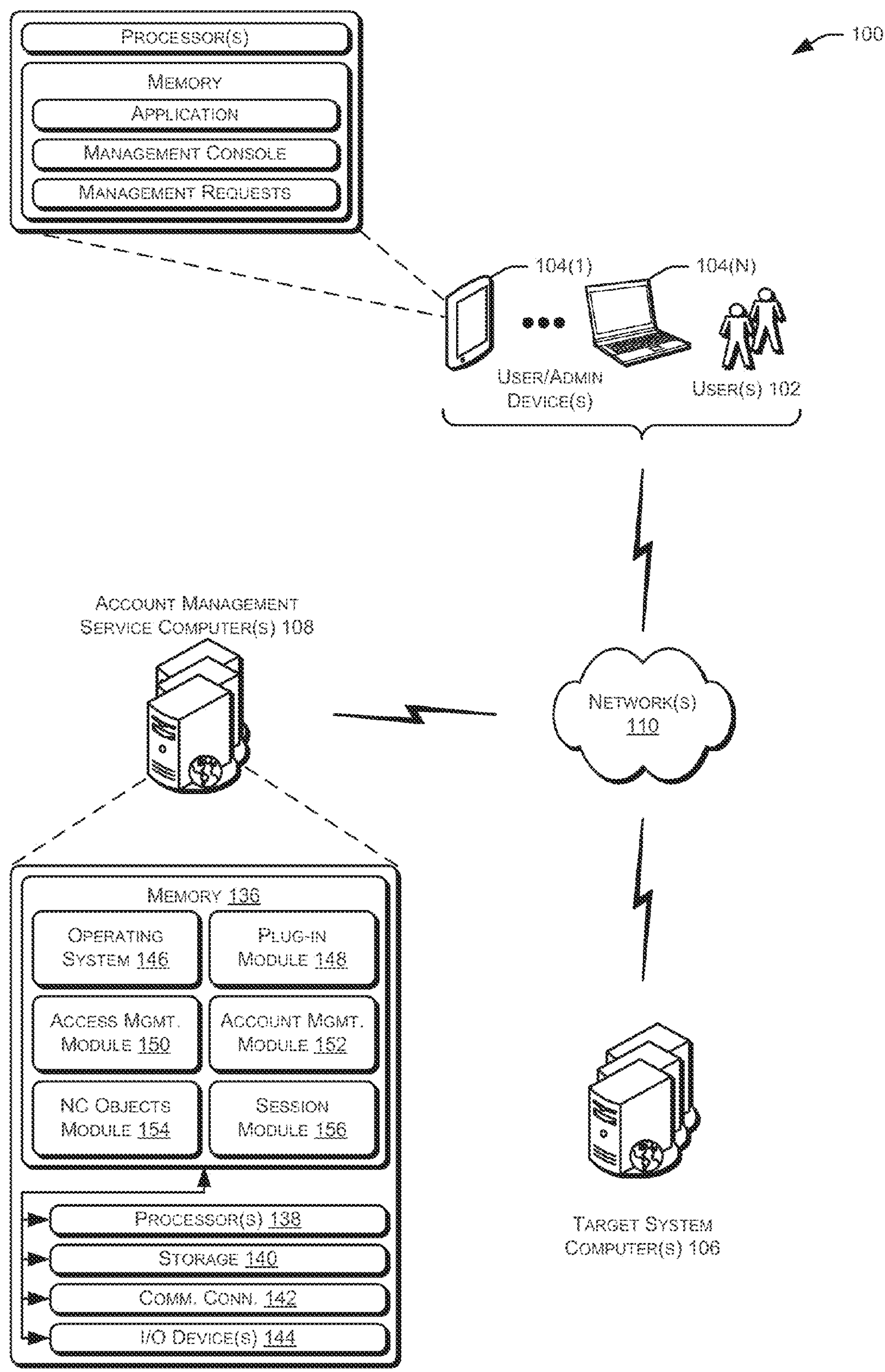
FIG. 1 is a simplified block diagram illustrating an example architecture for managing privileged accounts that includes one or more account management service computers, one or more user and/or administrator devices, and one or more target systems, connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems, computer-implemented methods, and/or computer-readable storage medium (e.g, a storage device) for managing privileged accounts via a privileged access management service are provided. In some examples, the service may be configured with a plug-in framework for accessing secure resources. In some aspects, plug-in code for implementing a workflow that includes step-up validation associated with a user attempting to access at least one secure resource may be received. Access to the at least one secure resource may be provided when the user is authenticated with respect to the service. In some examples, a request to access a second secure resource may be received. Additionally, in some examples, the workflow to perform the step-up validation may be implemented at least in response to the request to access the second secure resource. The workflow implemented based at least in part on an attribute associated with the request.

According to at least one example, a system may include memory, processors configured to access the memory, and a privileged access management module that provides a privileged access management service configured with a plug-in framework for accessing secure resources. The processors may also be configured to execute instructions to receive, from an entity associated with the secure resources, plug-in code for implementing a workflow that includes at least a step-up validation associated with a user attempting to access at least one secure resource of the secure resources. Additionally, the processors may also be configured to execute the instructions to generate instructions for implementing the workflow based at least in part on the received plug-in code, receive, from the user, a log-in request including at least first authentication information, the log-in request corresponding to the privileged access management service, provide access to the at least one secure resource when the user is authenticated with respect to the privileged access management service, receive, from a computing device of the user, a request to access a second secure resource of the secure resources, and implement the workflow to perform the step-up validation at least in response to the request to access the second secure resource, the workflow implemented based at least in part on an attribute associated with the request.

In some examples, the step-up validation may be performed by further executing the computer-executable instructions to at least provide a validation request to a second user, receive a validation response from the second user, and provide, to the user, access to the second secure resource when the step-up validation is satisfied based at least in part on the received validation response. In some aspects, the validation request may be an authorization request. The validation request may be provided to the user as an electronic message comprising at least one of a text message, an email message, a telephone call, a pop-up window message, a push notification message, or another type of message. In some examples, the step-up validation may be performed by further executing the computer-executable instructions to at least provide a validation request to the entity associated with the secure resources, receive a validation response from the entity, and provide, to the user, access to the second secure resource when the step-up validation is satisfied based at least in part on received validation response. Further, in some aspects, the access to the at least one secure resource may be provided by checking out a password, to the user, for accessing the at least one secure resource or may be provided by enabling a secure session, with the user, for accessing the at least one secure resource.

The foregoing, together with other features and embodiments will become more apparent upon referring to the following specification, claims, and accompanying drawings.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing privileged account management services (also referred to herein as "account management services") to one or more entities (e.g., users, account administrators, support users, target systems, users of target systems, administrators of target systems, and/or enterprise solutions) via a computing resource and/or computing system. As used herein, a target system may include, but is not limited to, a computer software product, a mobile application, a web application, a web server, a cloud-based application, or any other service that may be provided and/or administered by a computing device to access computing resources via one or more accounts. For example, an enterprise solution of a business may provide remote or other access to protected resources (e.g., networked files, directory information, or the like) of the business. As such, separate accounts may be implemented (e.g., user accounts, administrative accounts, and/or support accounts) for accessing or otherwise logging in to the enterprise solution. In this example, the enterprise solution hosted at a server or other computing system of the business may be the target system. However, the target system may also be hosted by the same system that manages the accounts; however, in some examples, the computing resources may be managed separately and/or securely from the account management information and/or services. The target system may include one or more databases, lightweight directory access protocol (LDAP) servers, UNIX systems or the like. As used herein, a privileged account may include one that relies on a password to receive access to the target system and/or one that may be accessed via a secure session.

In the following description, for the purposes of explanation, specific details are set forth in order to provide a thorough understanding of embodiments of the disclosure. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

FIG. 1 depicts a simplified example system or architecture 100 in which techniques for managing privileged account access may be implemented. In architecture 100, one or more users 102 (e.g., account holders) may utilize user computing devices 104(1)-(N) (collectively, "user devices 104") to access one or more target system computers 106 through one or more account management service computers 108 via one or more networks 110. In some aspects, the target system computers 106 may also be in communication with the one or more account management service computers 108 via the networks 110. For example, the users 102 may utilize the account management service computers 108 to access or otherwise manage data of the target system computers 106. In some examples, the users 102 may utilize the user devices 104 to interact with the account management service computers 108 by providing requests for access to the target system computers 106 and/or attempting to perform operations on resources of the target system computers 106. Such requests may then be executed by the account management service computers 108 on the resources of the target system computers 106 and/or by the target system computers 106. Further, in some examples, the account management service computers 108 and/or the target system computers 106 may be part of an integrated, distributed environment accessible to the user computing devices 104.

In some examples, the networks 110 may include any one or a combination of multiple different types of networks, such as cable networks, the Internet, wireless networks, cellular networks, intranet systems, and/or other private and/or public networks. While the illustrated example represents the users 102 accessing the account management service computers 108 over the networks 110, the described techniques may equally apply in instances where the users 102 interact with one or more account management service computers 108 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the account management service computers 108 via the networks 110, or via other network connections. Further, the user devices 104 may also be configured to provide one or more requests for access to secure resources of the target system computers 106.

In some aspects, the account management service computers 108 may also be any type of computing devices such as, but not limited to, mobile, desktop, thin-client, and/or cloud computing devices, such as servers. In some examples, the account management service computers 108 may be in communication with the user devices 104 via the networks 110, or via other network connections. The account management service computers 108 may include one or more servers, perhaps arranged in a cluster, as a server farm, or as individual servers not associated with one another. These servers may be configured to perform or otherwise host features described herein including, but not limited to, the management of login sessions for accessing secure resources of the target system computers 106, the management of step-up validation, the management of a plug-in framework configured to implement various features, and/or the management of controlling access and/or actions of network-connected objects, described herein. Additionally, in some aspects, the account management service computers 108 may be configured as part of an integrated, distributed computing environment that includes the target system computers 106.

In one illustrative configuration, the account management service computers 108 may include at least one memory 150 and one or more processing devices or units (or processor (s)) 138. The processor(s) 138 may be hardware units/devices. The memory 150 may store program instructions that are loadable and executable on the processor(s) 138, as well as data generated during the execution of these programs. Depending on the configuration and type of account management service computers 108, the memory 150 may be volatile (such as random access memory (RAM)) and/or non-volatile (such as read-only memory (ROM), flash memory, etc.). The account management service computers 108 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 150 may include multiple different types of memory, such as static random access memory (SRAM), dynamic random access memory (DRAM), or ROM.

The memory 150, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 150 and the additional storage 140 are all examples of computer storage media. Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The account management service computers 108 may also contain communications connection(s) 142 that allow the account management service computers 108 to communicate with a stored database, another computing device or server, user terminals, and/or other devices on the networks 110. The account management service computers 108 may also include input/output (I/O) device(s) 144, such as a keyboard, a mouse, a pen, a voice input device, a touch input device, a display, one or more speakers, a printer, etc.

Turning to the contents of the memory 150 in more detail, the memory 150 may include an operating system 146 and one or more application programs or services for implementing the features disclosed herein including at least a plug-in module 148, an access management module 150, an account management module 152, a network-connected objects control module 154, and/or a session module 156. As used herein, modules may refer to programming modules executed by servers or clusters of servers that are part of a service. In this particular context, the modules may be executed by the servers or clusters of servers that are part of the account management service computers 108.

In some aspects, an account management service may be provided, via the one or more account management service computers 108 in communication with the target system computers 106 and/or target accounts of any computing system. The account management service computers 108 may provide the ability for users, administrators, and/or support services of the target system computers 106 to manage credentials, grants, roles, types, and/or sessions of one or more accounts of the target system. In one example, the account management service, in some examples implemented by the access management module 150 and/or the account management module 152, may provide access management and security by managing log-in credentials for the one or more accounts of the target system. When a user or an administrator wishes to access the target system, the account management service may check out an appropriate password to the user. The user may then utilize the checked out password to log in to the target system. While checked out, the account management service may log or otherwise record interaction with the target system. In this way, malicious and/or other behavior may be properly attributed to the user and/or administrator that has the password checked out. In some examples, when the password is checked back in, a security account of the account management service (in some examples, a super root account) may log in to the target system and modify the password. Thus, subsequent requests to check out the password may receive a different password (i.e., the modified password).

In some examples, the account management service, for example implemented by the session module 156, may provide access management and security by managing a secure session for the one or more accounts of the target system. When a user or an administrator wishes to access the target system 106, the account management service 108 may open a secure session such that a user 102 (e.g., a user already logged in to the account management service 108) can access the target system 106 and/or other protected resources under the control of the account management service 108. The user 102 may then utilize the session (e.g., a gateway, proxy, bridge, or mediator between the user system and the target system) to access the target system 106 with the target system 106 receiving instructions and/or requests from the user system 104 and performing selected instructions and/or requests as appropriate. For example, if a user 102 with a particular permission attempts to perform an action outside their permission, the account management service 108 may not perform that action. In this way, the account management service 108 may maintain complete control of all interaction between the user system 104 and the target system 106 utilizing the described session management techniques of the session module 156. Additionally, in some examples, during a single session of a user 102, the rights of that user 102 may change. For example, a user 102 may have rights to change a password during a session (e.g., while a session is checked out and the account management service 108 is providing the controlled proxy service to the user 102); however, an administrator or other entity associated with the account management service 108 may change the rights of the user 102 during the session such that the user 102 can no longer change passwords. Other examples may include different rights, privileges, and/or roles that may be changed dynamically during a single session for users 102 (whether that user 102 is logged in or not). Actions may be taken by the session module 156 (e.g., the proxy service) to limit, block, cancel, and/or change the actions, rights, roles, and/or permissions of the user 102 while accessing the session.

Additionally, in some examples, a plug-in framework, for example implemented by the plug-in module 148, may be implemented by the account management service 108 that enables third-parties and/or other systems to interact with the account management service 108 utilizing their own code and/or instructions. In this way the account management service 108 may expose the plug-in framework (e.g., utilizing the plug-in module 148) that allows the third-parties to implement custom logic with the account management service 108. In some examples, the plug-in framework may be implemented using one or more application programming interfaces (APIs) (e.g., RESTful APIs or the like). In this way, a customer of the account management service 108 may implement custom logic associated with the password and/or session check-out functionality noted above. For example, a customer may implement logic, using the account management service APIs to have a message (e.g., an email, a text message, a telephone call, and/or electronic notification) sent to the customer when a user 102 or other entity checks out a password or utilizes/requests a session for accessing a privileged account or other resource of the account management service 108 and/or of the target system 106.

In some examples, a real-time workflow may enable the account management service 108 to provide administrators the ability to approve or otherwise make decisions about the attempted password and/or session check-out. Also, the workflow may be performed to require that the user 102 provide additional authentication information (e.g., a second password and/or a token). As such, the APIs may be utilized by the customers to provide custom logic for almost any procedure to be followed in response to any password/session checkout and/or action attempted to be performed during a session. For example, the custom logic may instruct the account management service 108 to place telephone call to an administrator or other entity associated with the target system 106 (e.g., the customer described above). The account management service 108 may initiate the telephone call which may include an automated message notifying the administrator of the access request. The telephone call may also include an indication of an action or option to be selected by the administrator (e.g., press "1" to allow access or "2" to deny access to the requesting user 102). Upon receipt of the selection, the account management service 108 may perform instructions to allow or deny access (e.g., a password check-out, a session check-out, and/or an action requested to be performed by a logged-in user) to the user 102. Additionally, certain events (e.g., actions taken a by user 102 logged into a session of the session module 152) may trigger particular actions based at least in part on the custom logic. The events may include hitting a "return" key or typing while logged in. These events may trigger workflows or other actions of the session module 156 (also referred to as the "session manager"). The events, triggers, and/or actions may be configured through the APIs. In some examples, a "customer" may be any entity (e.g., an enterprise customer or owner of secure resources of the target system 106) that subscribes with the account management service computers 108 to enable access of users 102 to its secure resources.

In some examples, a dynamic password policy management service may allow administrators to group one or more accounts together based at least in part on user-/administrator-defined roles. For example, roles may include, but are not limited to, user accounts, administrator accounts, root accounts, or the like. Once the role based groups are identified, access grants may be set, determined, or otherwise managed. As such, when a new account is created by the target system, to be managed by the account management service 108, the role of the new account may identify an appropriate group in which it should be included. If the account is placed in that group, access grants may then be dynamically inherited by the new account based on it being in added to the group. Additionally, if access grants are changed for a particular group, each account managed by the group may be dynamically updated, with the new access grant, without necessitating manual updating of each account's grant policy.

As noted above, the account management service 108 may be configured with a plug-in framework, using one or more APIs, that enable custom logic of customers (e.g., developers, administrators, and/or resource owners) for accessing software applications (e.g., enterprise solutions or the like) and/or network resources (e.g., virtual machines, network-accessible data, etc.) of the customers. In some examples, the account management service may be implemented or deployed within a single virtual machine (e.g., a java virtual machine or the like) or processor. Additionally, the plugin framework may be deployed in a separate virtual machine. In this way, if a customer's custom logic is malicious or accidentally attempts to do something that would be harmful to the account management service 108, the account management service 108 will be protected. Alternatively, or in addition, in some aspects, the customers may be instructed to take on their own responsibility for errors in logic and code of the customer. That is, the author of the plugin will become part of the application and thus bears the burden. Another method is to have each plugin run within a separate thread and/or a separate virtual machine (e.g., spawned by a separate root, host, server, or the like). In some examples, the account management service 108 may enable a first plugin to be run in a first virtual machine and a second plugin to be run in a second virtual machine. The first plugin may be trusted and, thus, the first virtual machine may the same virtual machine with which the account management service 108 is run. However, the second virtual machine may not be trusted and, as such, the second virtual machine may be separate (e.g., on a different server or the like) from the first virtual machine.

Additionally, in some examples, the plug-ins may be isolated in "sandboxes" (e.g., secured portions of a processor that may not be accessible by other entities). In this way, the third-party plug-ins that are written may not be inclusive with the account management service 108. Additionally, this sandboxing protects the account management service from being affected by the code and/or instructions performed by the plug-ins. As such, in order to implement the sandboxing, the account management service 108 may deploy a separate service for enabling interaction between the plug-ins and the account management service 108. In some examples, the data that is to be communicated may always be definable. However, the way in which the data is communicated may be performed separately by the plug-in service. The plug-in service may be a completely different service deployed and/or implemented on a different server, virtual machine, or the like as described above. In this way, the plug-ins may interact with the account management service 108 (or other application); however, the plug-ins won't be able to touch the account management service 108 (or other application). In other words, the plug-in may not be able to change anything about the account management service 108 without first going through the plug-in service.

In some examples, the account management service 108 may also be configured to control, for example utilizing the network-connected objects control module 154 and/or the plug-in module 148, network-connected physical objects (e.g., a door lock, an engine, a light bulb, a thermostat, an oven, etc.) via the plug-in framework. For example, a customer may identify a physical object as a resource. Instructions may be provided via an API or other plug-in interface functionality for accessing that resource in a similar way that passwords and/or sessions may be accessed. As one non-limiting example, a customer may designate a network-connected door lock as an account of the account management service 108. Then, using the plug-in framework, an account holder could log into the account management service 108 and check out a password. This password may then enable the account management service 108 to unlock the door lock. Alternatively, the user 102 may check out a session which would allow the proxy described above to interact with the lock for the user 102. Thus, allowing the plug-in logic author (e.g., the customer) control of which users 102 may open the door lock, at what times, and/or for how long. Additionally, the custom logic may enable messaging to indicate and/or to ask permission for particular users 102 to access (e.g., lock or unlock) the door lock. Additionally, in this way, product developers may be able to write custom logic for securely accessing their network-connected products, and allow their customers (e.g., the users 102) to access the functionality of the products using the account management service 108. For example, a remote door lock manufacturer may write some custom logic, based at least in part on the plug-in framework (e.g., utilizing an API in association with the plug-in module 148) of the account management service 108 to unlock the door lock. A user 102 who purchases the door lock may then sign up for an account with the account management service 108. Once logged into the account management service 108, the user 102 may then utilize the account management service 108 to lock and/or unlock the door of the product manufacturer independent of having an account or application associated with the manufacturer or developer. A wide array of customizable functions may then be configured for each product, some functions different from others and/or some security/authentication/authorization features different from others.

Additionally, in some examples, the account management service 108 may enable a single user 102 to manage multiple different network resources (e.g., physical objects), each possibly from different manufacturers and/or service providers. Further, in some cases, the account management service 108 may be configured to manage a digital account (e.g., a traditional network resource such as, but not limited to, an account, a virtual machine, some network data, etc.) and a physical device (e.g., a door lock, a vehicle, etc.). In this way, the account management service 108 may bridge the gap between digital resources and physical objects. As such, the account management service 108 could provide access to an account and a physical object. The account management service 108 could also provide access to a password or a session and a networked device.

In some other examples, a two-man rule or four-eyes rule may be implemented with the account management service 108 such that additional security may be established, as desired. In some cases, the two-man rule implies that two actors and/or entities must approve of and/or request an action in order for the action to be implemented. This would make it such that two bad actors would have to be involved in order for a security breach to take place, thus decreasing the probability of such an event. One way to manage this, within an account management service 108, is to grant privileged access (e.g., via the session module 156 noted above) to two different users 102 at the same time. As such, in some examples, certain accounts may be flagged as important, and the two-man rule may be employed for those flagged accounts. For these accounts, two users 102 may be required to share a session (e.g., be logged into the session manager together), and be able to view the actions of the other. That way, if one user 102 is attempting to perform a malicious or otherwise harmful action, the second user 102 (e.g., sharing the session) would be able to see the attempt, stop the attempt, and/or report the attempt. In some examples, input and/or output may be performed and/or provided to both users 102 that are sharing the session. In at least one example, if the first user 102 is attempting to perform an inappropriate and/or disruptive operation, the second user 102 (e.g., the one sharing the session) may immediately log out of the shared session, thus ending the session of the first user 102. Additionally, in some examples, both the first user 102 and the second user 102 may be required to log into the shared session together. In other words, entry to the shared session may require both the first and second users 102. Additionally, operation of the shared session may be required by both parties in order for the session to be maintained. However, the exit point of the shared session may be controlled by either user 102; because, once one of the users 102 exits the shared session, the shared session may end. In at least one example, the first user 102 and the second user 102 may not be the same person. However, as used herein, at least in the context of the session manager and/or the two-man rule, the first user and/or the second user may be entities (e.g., virtual machines, processors, accounts, or other computing resources acting on behalf of a user) and may not be human users at all.

In some example, the two-man rule may ensure concurrency of the two account holders, users, and/or entities that are needed to be logged in to share the session. The concurrency can help ensure that the two-man rule actually provides the intended security. In at least one example, the concurrency may be established based at least in part on the passwords of the two sharing users. For example, it may be required that the two passwords are different. In this way, no one user could trick the system and log in as both users. Another way of ensuring concurrency could be to require that the two users are logged in from different Internet Protocol (IP) addresses, from different processors, and/or from different network or geographic locations. Half-passwords and/or half-tokens (e.g., where each of the two users shares a half of a password and/or a half of a token) may also be utilized to ensure entry-point concurrency. Additionally, in some examples, each user may be required to be in front of their monitor (e.g., if a first user's computer enters sleep mode, if the first user's computer identifies or determines that the first user is no longer viewing the monitor, and/or if the first user has not been active for a period of time, etc.). In some examples, the shared session may be an entire screen, a particular interface of a screen, and/or other interfaces that each of the users may be able to view. These methods may also be used in the context of physical things, such that (using the networked physical door lock noted above) a door lock may only be unlocked when two users are approving, sharing a session, or checking out a password at the same time.

In some examples, step-up authentication/authorization may employed by the plug-in framework to enable additional levels of security. As noted above, the step-up procedures may include announcing the attempted action/request to an administrator or other entity, having the attempted action/request approved by an administrator or other entity, and/or further requiring secondary authentication (e.g., additional passwords and/or tokens) by the requestor. Additionally, in some examples, the plug-in framework may require a first authentication by a user 102, and each plug-in may require a second authentication. As such, the step-up authentication procedures may be based at least in part on which users 102 are trying to log in to access the account management service 108. Additionally, the authentication (e.g., a password) required for the plug-in framework may be framework specific, while the authentication required by each plug-in may be plug-in specific (e.g., customizable by the author of the plug-in). In some examples, the particular plug-in (and, thus, the particular authentication required) may be based at least in part on the user 102 attempting to access a resource and the resource that user 102 is attempting to access. For example, if user 1 is attempting to access resource 1, plug-in 1 might fire; however, for user 2 attempting to access resource 1, plug-in 3 might fire. In some examples, a mapping may be stored at the plug-in framework level that identifies which plug-ins to use for which users and/or accounts. In some aspects, the mapping (while stored at the framework level) may be defined by the plug-in themselves. For example, a particular plug-in may be registered that applies to all users of a particular type (e.g., sales managers), and then when a sales manager attempts to log-in, that particular plug-in may be utilized.

Additionally, in some examples, step-up authorization may be implemented by the account management service 108. A user 102 may attempt to check out a password or session from the account management service 108, and the account management service 108 may request a token (e.g., via the workflow described above) and/or a service ticket number from an external system. There may also be a tracking system for service tickets that are open, determine whether the user 102 is authorized to check out the resource based at least in part on service ticket number. The plug-in may be able to determine whether there is a ticket open for the account. Additionally, authorization may also be based on roles.

In some examples, the account management service 108 is configured to enable dynamic policies, roles, permissions, etc., by offering session access that can be monitored (e.g., each keystroke, command, etc.), two-man rule functionality, and/or step-up authentication/authorization services. In some cases, these additional functionalities further enable enforcement of command line input security (e.g., not allowing a command to be entered or the like) and/or the ability to change a user's permissions in the middle of a log-in session. For example, the account management service 108 may provide a user 102 permission to implement a first action, but not allow it again later; to provide a user 102 permission to implement actions or access resources only during certain periods (windows of time in the year, month, week, day, hour, etc.); and/or to provide a user 102 permission to implement actions or access resources for limited amounts of time. Additionally, the account management service 108 is fully extensible to have any of the above mentioned features, functionalities, and/or customizations implemented within any of the above systems. As such, the policies of the account management service 108 may be pre-defined, but they may also be dependent on runtime usage information or the like. For example, a user's 102 permission may, in some examples, be based at least in part on runtime usage of the user 102. In some examples, it may be the plug-in architecture of the account management service 108 that enables the customization, runtime usage modifications, dynamicity, and/or extensibility of the system.

Figure 2:
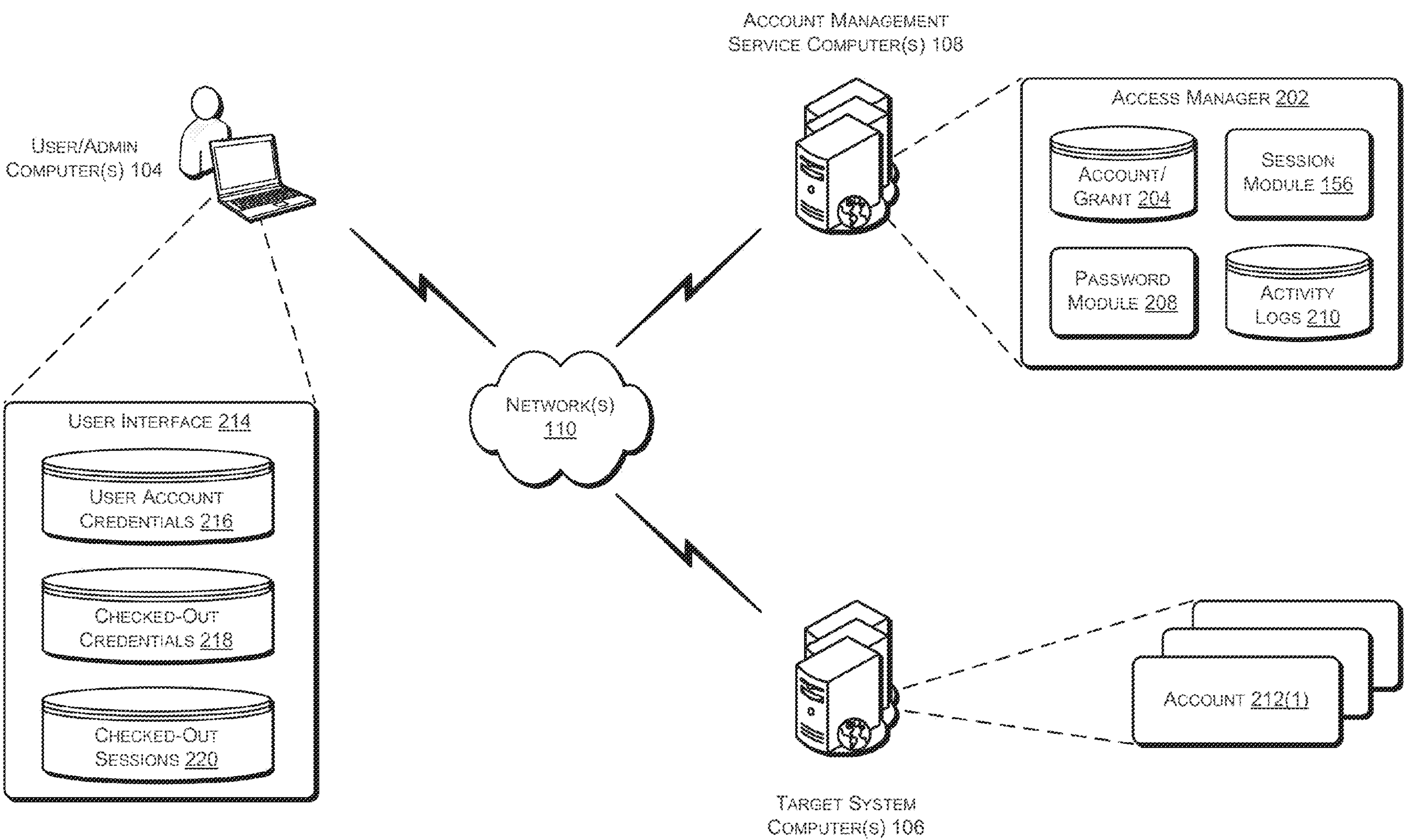
FIG. 2 is a simplified block diagram illustrating at least some features of an access management system implemented by one or more account management service computers described herein, according to at least one example.

As noted, in at least one example, one or more aspects of the environment or architecture 100 may incorporate and/or be incorporated into a distributed program execution service such as that hosted by the account management service computers 108. FIG. 2 depicts a simplified architecture 200 illustrating additional aspects and/or features of the account management service computers 108 of FIG. 1. For example, FIG. 2 illustrates an access manager 202, such as that implemented by the access management module 150 of FIG. 1, configured to store and/or manage account/grant data 204, a session module 206, a password module 208, and/or activity logs 210. Similar to that described with reference to FIG. 1, the account management service computers 108 may be in communication with one or more target system computers 106, and/or user/administrator computers 104 via the one or more networks 110. Additionally, as described above, the one or more target system computers 106 may include one or more accounts 212(1)-(N), collectively accounts 212. While the user/administrator computers 104 are shown here as a laptop computer, any computing device accessible to a user 102 or an administrator of an account or application may be utilized. Further, as described above, the user/administrator computers 104 may include a user interface 214 for receiving instructions and/or providing feedback to the user 102 and/or administrator. The user interface 214 may also be stored in a memory configured to store user account credentials 216, checked-out credentials 218, and/or checked-out sessions 220.

In one non-limiting example, a user 102 (or an administrator) of an account 212 associated with a target system computer 106 may provide user credentials 216 for accessing the account management service computers 108. In this example, it is assumed that the accounts 212 have already been brought under the management of the account management service 108 (i.e., the accounts 212 have been registered with the access manager 202 and/or appropriate account information 204 has been stored therein). Upon authenticating the user 102 and checking the grant data 204 (e.g., to determine whether the user has been granted rights to access the account), the access manager 202 may provide, from the password module 208, a password for logging into the account 212 and/or a secure session (e.g., utilizing Secure Shell (SSH) or another communication protocol) from the session module 156. In some examples, the fact that the password and/or the session has been checked out to the user 102 may be logged in the activity log 210. Additionally, the user computer 104 may now store the password in the checked-out credentials data store 218. The user may now log into the account 212. Any, some, or all activity associated with the user computer 104 and the account 212 may also be logged in the activity logs 210 while the password and/or session is checked out to the user. In some aspects, when the user 102 is finished accessing the account 212, the user 102 may check the password back in with the access manager 202 and/or end the session. This action may also be logged in the activity logs 210. Upon checking the password back in or ending the session, the access manager 202 may automatically invoke the password module 208.

Figure 3:
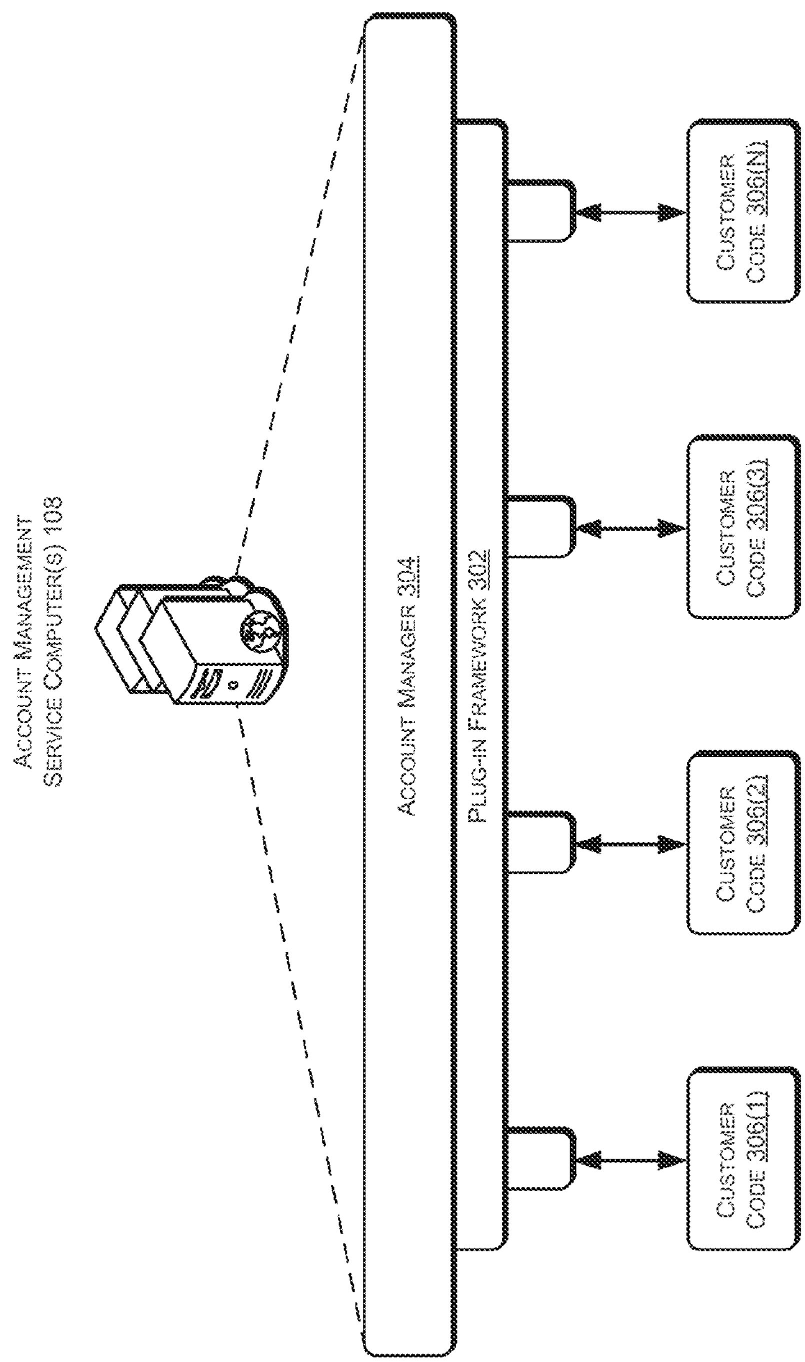
FIG. 3 is a simplified block diagram illustrating at least some features of a plug-in framework for account management service implemented by one or more account management service computers described herein, according to at least one example.

FIG. 3 depicts an example implementation of a plug-in framework 302 that may be implemented by the plug-in module 148 of FIG. 1. In some examples, the account management service computers 108 may implement an account manager 304 (e.g., implemented by the account module 152 of FIG. 1) for providing access the secure resources of a target account. As noted, the plug-in framework 302 may enable customers to provide customer code (e.g., plug-in code) 306(1)-(N), collectively customer code 306, for setting rules, privileges, APIs, and/or workflows for accessing the target resources. In some examples, each set of customer code 306 may instruct the plug-in framework 302 about what operations to perform with respect the corresponding customer accounts and/or customer resources (e.g., secure resources of the target systems). As such, the customer code 306 may indicate which APIs will be used for what functions, which users 102 can utilize which resources and when, as well as which policies, roles, and/or rules should apply to what resources and/or what users.

Figure 4:
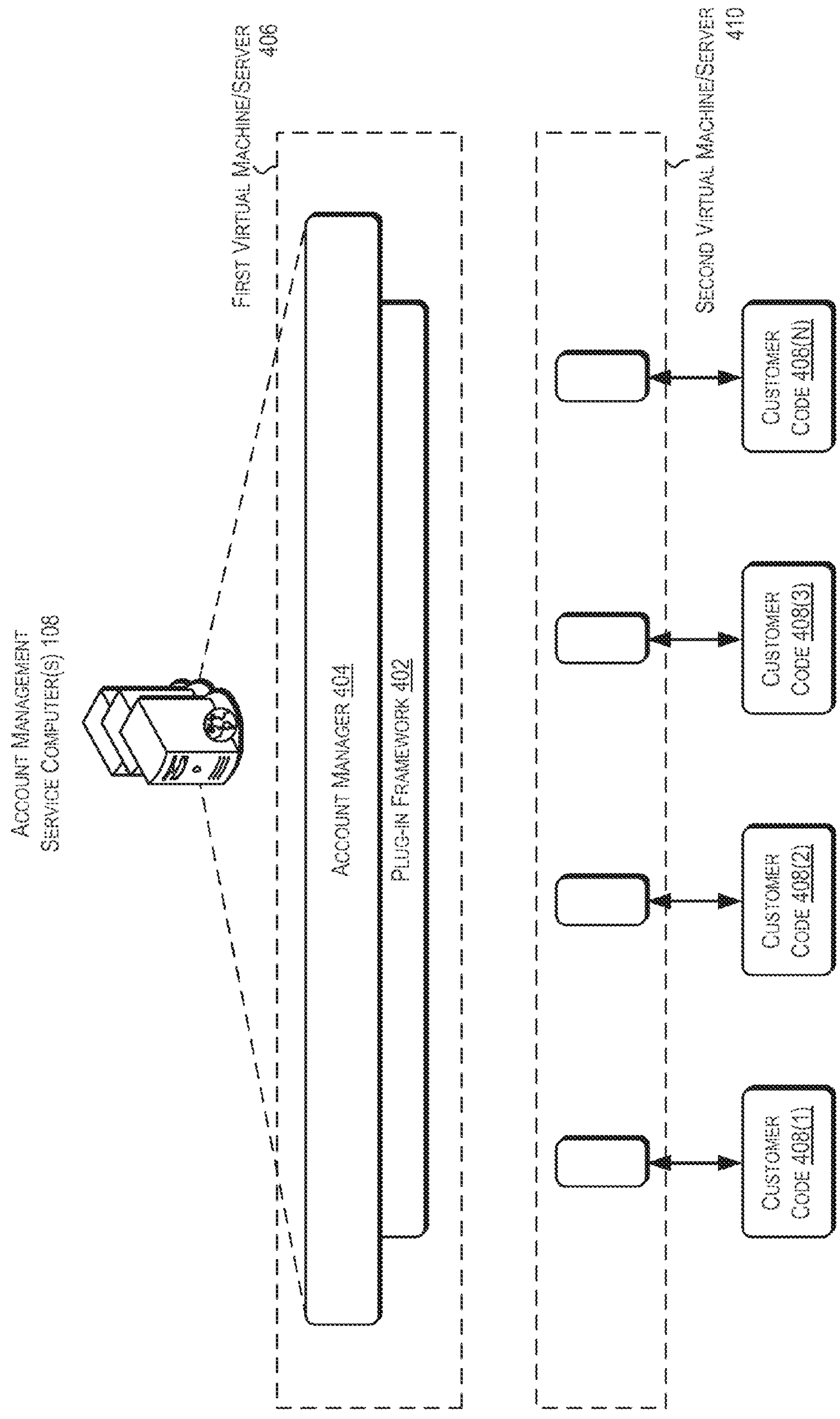
FIG. 4 is a simplified block diagram illustrating at least some additional features of a plug-in framework for account management service implemented by one or more account management service computers described herein, according to at least one example.

FIG. 4 depicts another example implementation of a plug-in framework 402. In this example, the account manager 404 of the account management service computers 108 may be implemented by or utilizing a first virtual machine server 406, while the plug-in modules (e.g., based at least in part on respective customer code 408(1)-(N)) may be implemented by or utilizing a second virtual machine server 410. In this way, the plug-in framework 402 may be sandboxed from the plug-ins generated by the customer code 408, such that the customer code 408 cannot adversely affect the plug-in framework 402 or the account manager 404.

Figure 5:
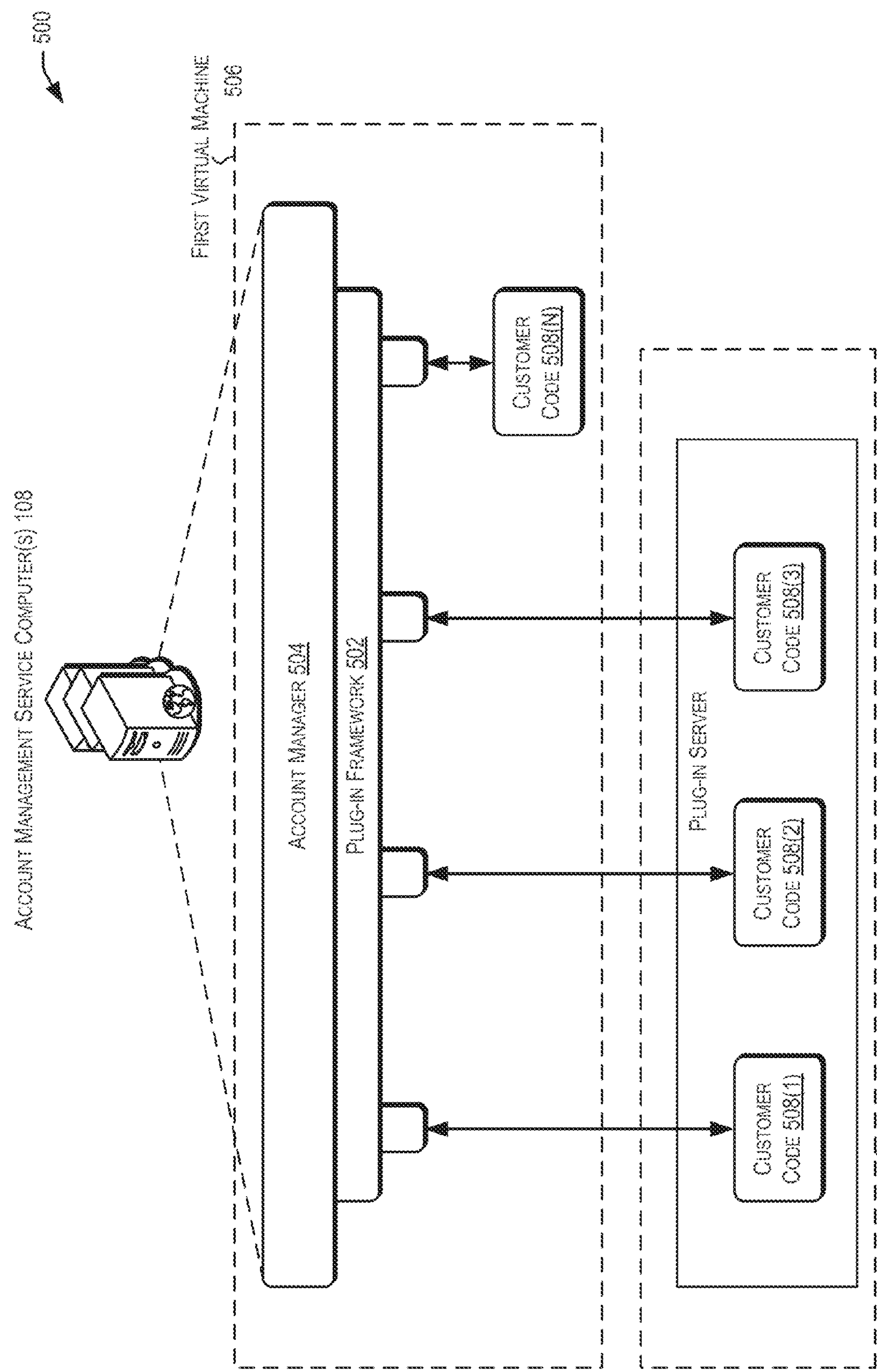
FIG. 5 is a simplified block diagram illustrating at least some additional features of a plug-in framework for account management service implemented by one or more account management service computers described herein, according to at least one example.

FIG. 5 depicts another example implementation of a plug-in framework 502. In this example, the account manager 504 of the account management service computers 108 may be implemented by or utilizing a first virtual machine 506, while the plug-in modules (e.g., based at least in part on respective customer code 508(1)-(3)) may be implemented by or utilizing a second virtual machine 510. In this way, the plug-in framework 502 may be sandboxed from the plug-ins generated by the customer code 508(1)-(3), such that the customer code 508(1)-(3) cannot adversely affect the plug-in framework 502 or the account manager 504. However, this example illustrates the possibility that at least one plug-in (e.g., based at least in part on customer code 508(4)) may access the plug-in framework 502 directly (e.g., implemented on the first virtual machine 506). Here, the customer code 508(4) may be trusted code that is given access to change or otherwise update the plug-in framework, the account manager 504, and/or the account management service 108 (e.g., to change policies, update root elements, or the like).

Figure 6:
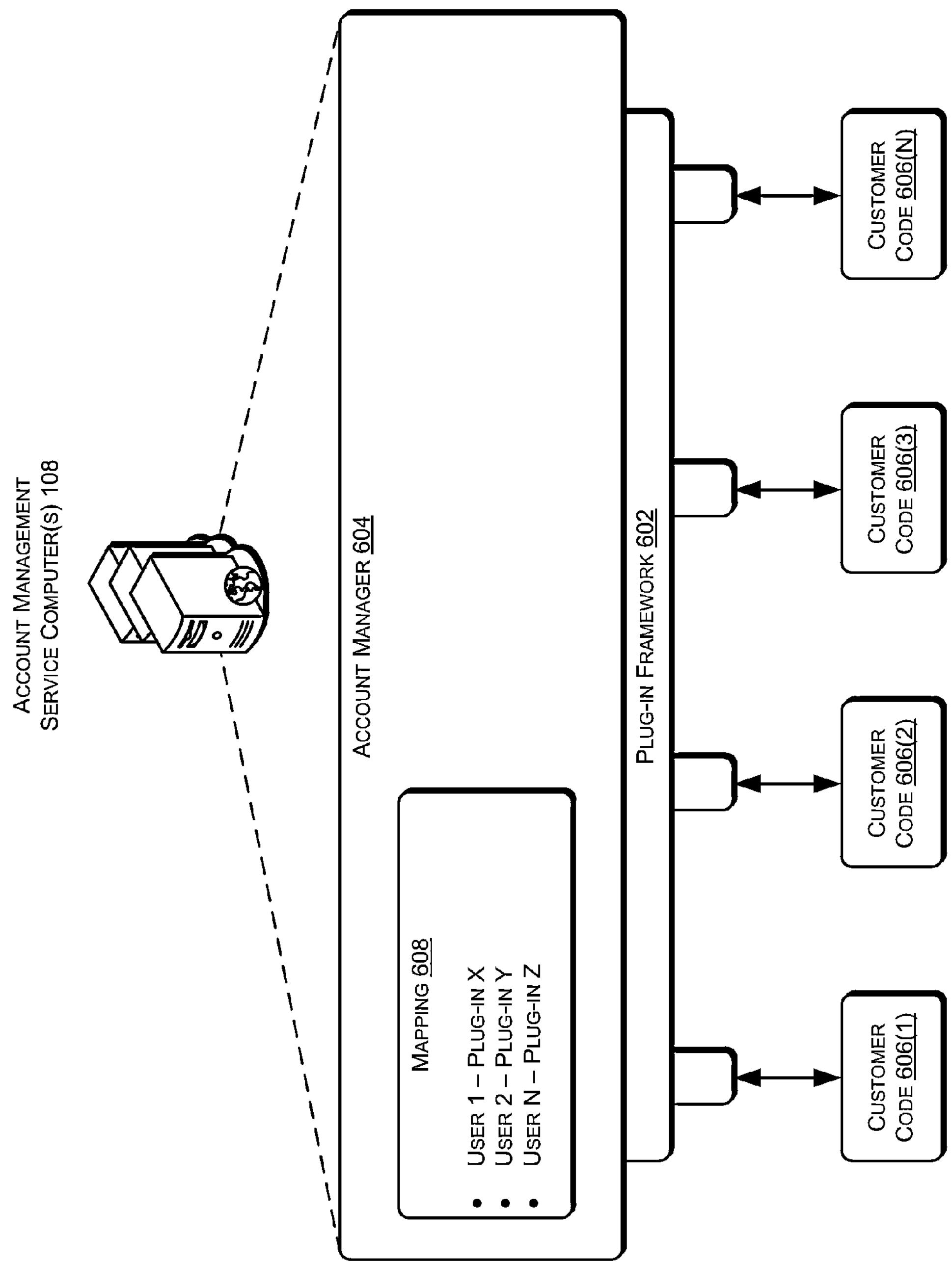
FIG. 6 is a simplified block diagram illustrating at least some additional features of a plug-in framework for account management service implemented by one or more account management service computers described herein, according to at least one example.

FIG. 6 depicts yet another example of a plug-in framework 602 of an account manager 604 implemented within an account management service computer 108. As before, plug-ins may enable customer code 606(1)-(N) to configure the plug-in framework 602 to grant access to a target system based at least in part on the specific policy rules, real-time information, and/or resources associated with each customer. As seen in FIG. 6, the account manager 604 may be configured to store or otherwise manage one or more mappings 608 that may identify specific plug-ins to be used for particular users. Of course, the mappings could be between plug-ins and resources, plug-ins and policies, plug-ins and groups of users, etc.

Figure 7:
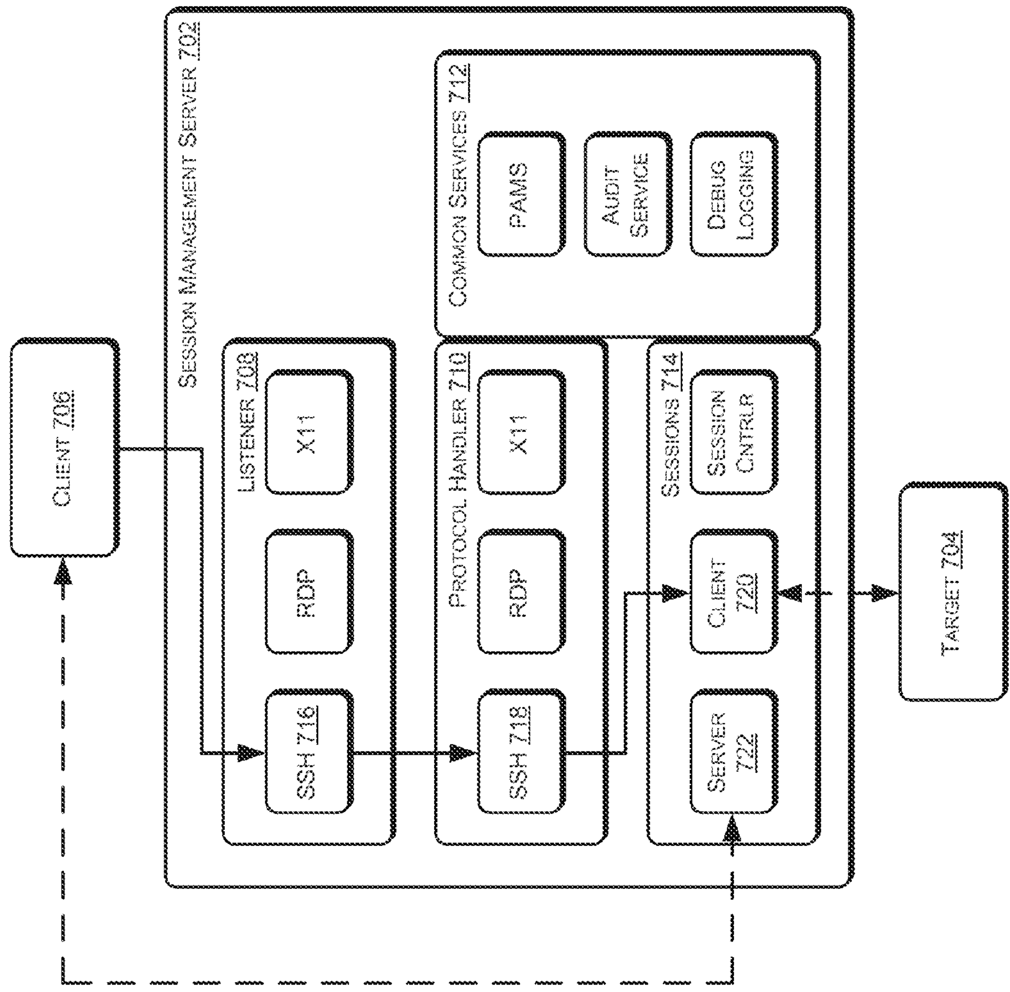
FIG. 7 is a simplified block diagram illustrating at least some features of a session management server for an account management service implemented by one or more account management service computers described herein, according to at least one example.

FIG. 7 depicts an example session management server 702 configured to effectively manage access of a target 704 by a client 708. In some examples, the session management server 702 may be one of the account management service computers 108 of FIG. 1 and/or may be a specific implementation of the session module 156, also if FIG. 1. As seen in FIG. 7, the session management server 702 may include a listener 708, a protocol handler 710, common services 712, and/or one or more sessions 714. The listener 708 may listen for requests from the client 706 to open a session and/or for requests from the client to perform actions on the target 704 once the session is open. Additionally, in some examples, once the session is already open, the listener 708 may be configured to identify actions/operations that the client 706 is attempting to make. Through an SSH module 716 (or other communication protocol) the listener may pass these requests and/or actions of the client 706 to a corresponding SSH module 718 of the protocol handler 710. From there, the operations and/or requests may be processed via the session 714 through a client module 720 of the session 714. Content, secure resources of the target 704, and/or information about the session 714 may be communicated back to the client 706 via a server module 722 of the session 714. Additionally, in some examples, the system can be extended to handle other protocols via one or more protocol support modules.

The privileged session management server 702 may be configured to control which account of a set of accounts needs privileged access and who can get the access. The privileged account management service 108 (sometimes referred to herein as "PAM") may provide additional capabilities via policies or other factors on how and when the privileged access can be achieved. The privileged account management service 108 can grant different policies to users to allow diversified usage and the same user may get different access privileges based on policy driven runtime decisions.

The privileged account management service 108 can provide access to the password for a privileged account. The privileged account management service 108 can also provide the session with the privileged account without providing the password. The policy can control whether password, session or both can be provided to a user. For example, a privileged UNIX account root's password can be provided or a UNIX SSH session which is started as root can be provided without the password.

The privileged account management service 108 policies allow flexibility to decide whether access is granted or not based on runtime factors such as the time at which the request is made, the locality from which the request is received, the software client making the request and how many clients are making the request. For example the policy can determine whether access is granted 24/7 or only 9-5 on weekdays, only to particular localities such as Asia or North America based on Internet Protocol (IP) addresses, only to a client supporting SSH v3 or above, or only to one person or multiple at a time.

A privileged account may have several capabilities; the privileged account management service 108 through policies allows which capabilities need to be granted to a particular user. Previously discussed runtime factors also come into play here such that a capability may be exposed or not based on the time, locality, and other characteristics that are determined when the request is made. For example a UNIX privileged account can have capabilities to establish UNIX SSH command line session, UNIX X11 graphical session and UNIX SCP file transfer. PAM policies can decide whether to expose all UNIX capabilities or a subset to a particular user and whether to make the decision based on runtime factors.

A privileged account may be allowed to perform a list of actions/commands on a system based on its privileges. A user accessing such a privileged account gets to perform all of those allowed commands. The privileged account management service 108 provides an additional layer of policy based restriction on which commands can be executed, by whom and based on runtime factors. For example a UNIX privileged account root can run commands such as useradd/userdel to add or remove any user, password to change any user's password, etc. The privileged account management service 108 may allow one user to access only useradd/userdel command and another user only password command even, for example, when those users are logged in as root. Further the privileged account management service 108 may allow useradd/userdel to be run only on working hours between 9-5 Mon to Fri for one user but let another user have 24/7 access to the command (again, in some cases, these access limitations may be applied on the users when they are logged in as root).

The privileged account management service 108 may manage a privileged UNIX account root on a UNIX target system. For a group of support users the system needs to be accessible only during working hours between 9 to 5 and Monday to Friday through direct session without accessing password. Also support users may only be allowed to run a predefined set of diagnostic commands and may not be allowed to run other system management commands such as password change or new account creation. A group of UNIX administrators may be allowed complete access on all days. This is accomplished by creating two polices, policy A restricting access as per support group usage needs and policy B providing unrestricted access as per administrators group usage. The UNIX account root is granted to the support group with association to policy A, and granted to the administrators group with association to policy B.

Figure 8:
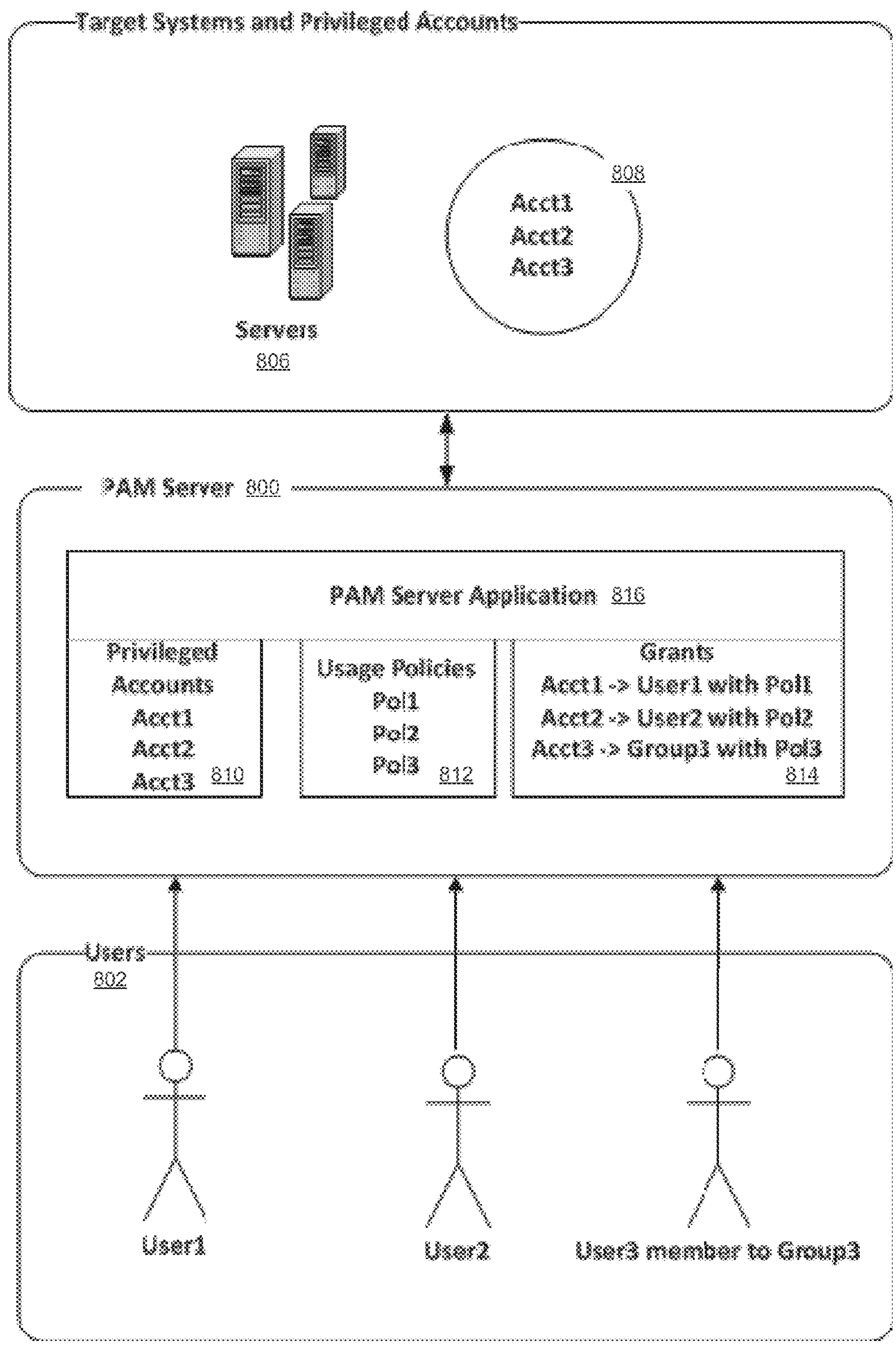
FIG. 8 is a simplified block diagram illustrating at least some features of a privileged access management server for an account management service implemented by one or more account management service computers described herein, according to at least one example.

FIG. 8 depicts additional features of the account management service computers 108 of FIG. 1. By way of example, a privileged account management server 800 of the account management service 108 may be configured to sit between and manage communication between users 802 and target servers/privileged accounts 804 (collectively, "target resources"). The target resources 804 may include target servers 806 and/or target privileged accounts 808 such as, but not limited to, Lightweight Directory Access Protocol (LDAP) targets, UNIX targets, and/or other database targets. As described above particular users and/or groups of users may be assigned particular usage policies and/or grants. The mapping of such information (e.g., privileged accounts 810, to usage policies 812, to grants 814) may be stored in a privileged account server application 816 of the privileged account management server 800.

Figure 9:
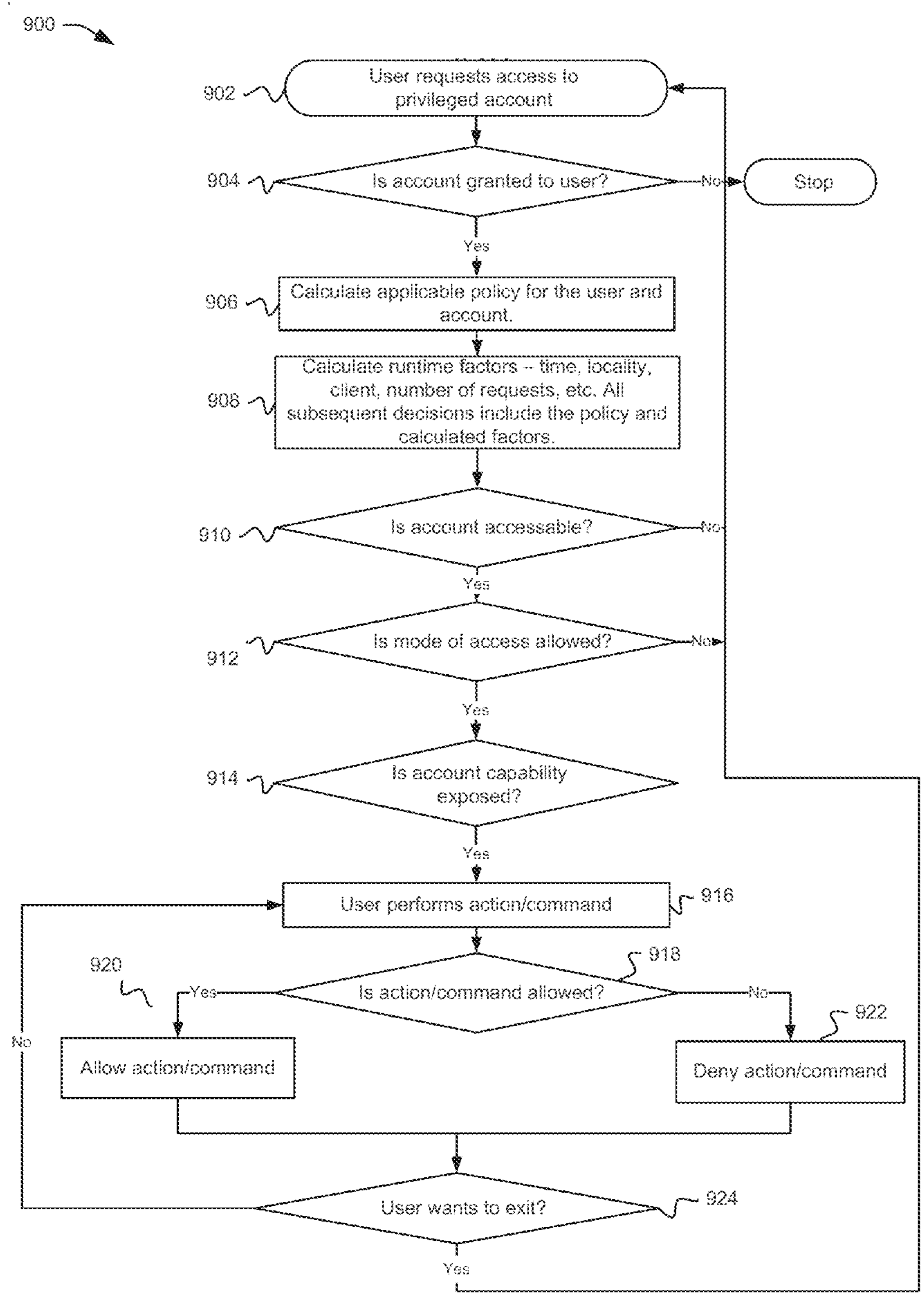
FIG. 9 is a simplified flow diagram illustrating at least some features of a session management service implemented by one or more account management service computers described herein, according to at least one example.

FIG. 9 illustrates a simplified example flow diagram showing process 900 for providing privileged account management services. The process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some aspects, the process 900 of FIG. 9 may be performed by the one or more account management service computers 108 shown in FIG. 1. In particular, some or all of the process 900 of FIG. 9 may be performed by the access management module 150 and/or the session module 156 of FIG. 1. The process 900 may begin by receiving, from a user computer, requests for access to a privileged account at 902. As noted above, the information may include, but is not limited to, an identification of the account, users of the account, grants associated with the account and/or the user, associated target system information, or the like. At 904, the process 900 may determine whether the access to the account should be granted to the user. If not, the process 900 may return to 902 to receive another request from the user. However, if the process 900 determines that the access to the account should be granted to the user, the process 900 may continue to 906, where the process 900 may calculate an applicable policy for the user and the account.

In some examples, the process 900 may then calculate runtime factors such as, but not limited to, time, locality, client, number of requests, etc., at 908. In some examples, all subsequent decisions of the process 900 may include the policy and runtime factors calculated at 906 and 908. The process 900, at 910, may then determine the account is accessible. If not, the process 900 may return to 902. However, if so, the process 900 may determine whether the mode of access is allowed at 912. In other words, the process 900 may determine at 912 whether session access is allowed for the target being requested (in some examples, this may be based at least in part on the plug-in, a workflow associated with the plug-in, and/or the policy/grant rights associated with the user and/or the account. If the mode of access is not allowed, the process 900 may return to 902. However, if it is, the process 900 may continue to determine whether the account capability is exposed at 914. If not, the process 900 may return to 902. However, if it is, the process 900 may continue to identify that the user is performing an action/command at 916. At 918, the process 900 may determine whether the action/command is allowed based at least in part on the plug-in. If so, the process 900 may allow the action/command at 920 and then continue to 922, where the process 900 may determine whether the user wants to exit. If not, the process 900 may return to 916. On the other hand, if the process determines at 918 that the action/command is not allowed, the process 900 may deny the action/command at 922 and then continue to 924. If the process 900 determines at 924 that the user wants to exit, the process 900 may end or return to 902.

Figure 10:
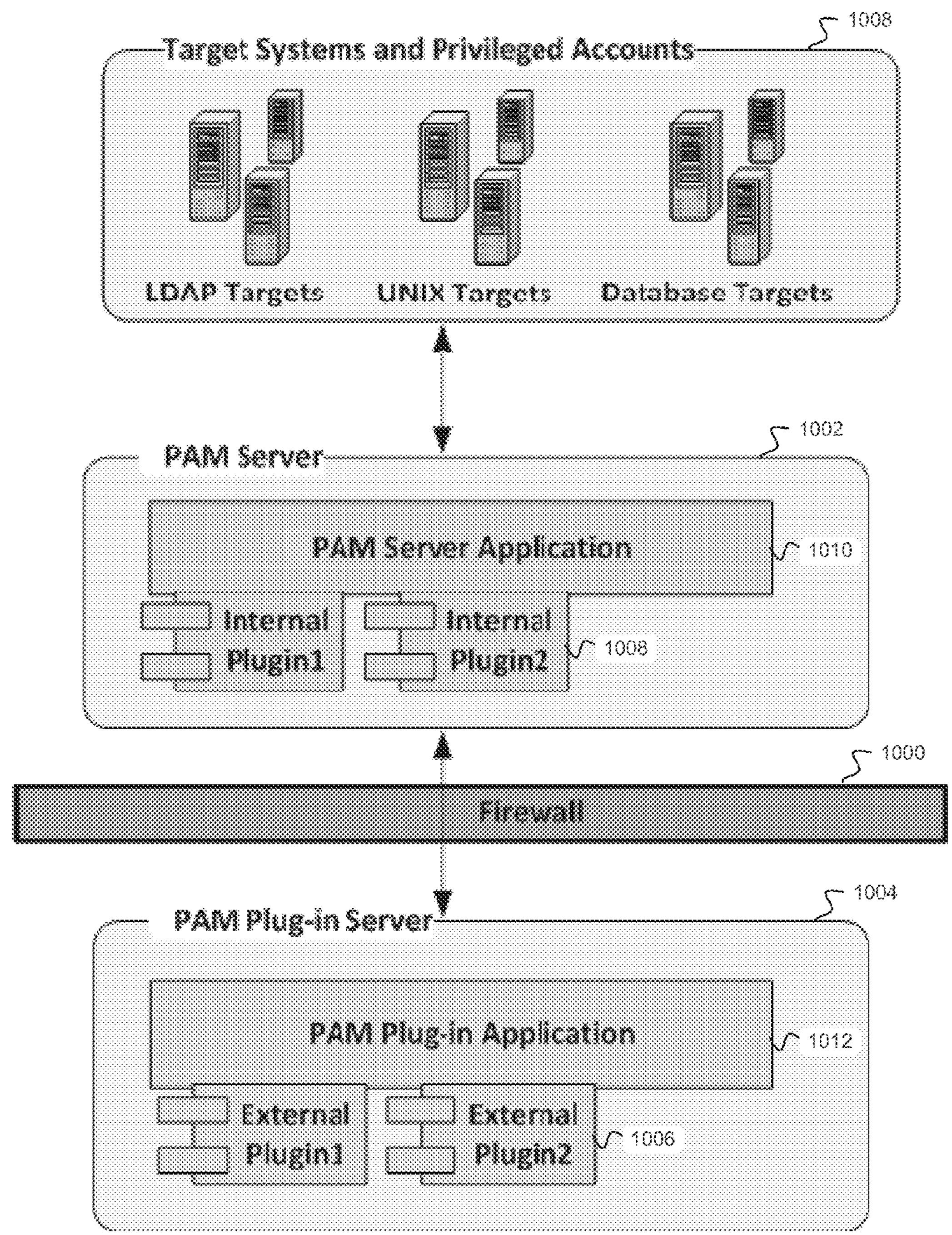
FIG. 10 is a simplified block diagram illustrating at least some features of a session management service with a plug-in framework implemented by one or more account management service computers described herein, according to at least one example.

FIG. 10 depicts another architecture showing examples of implementing the account management service 108 of FIG. 1. In this example, a firewall 1000 can be seen between the privileged account management server 1002 (similar to the privileged account management server 800 of FIG. 8) and a privileged account management plug-in server 1004. External plug-ins 1006 may be based at least in part on customer code that is untrusted while internal plug-ins 1008 may be based at least in part on trusted customer code or plug-in code generated by the account management service 108 itself.

The privileged account management service 108 deals with managing privileged accounts in various target systems such as, but not limited to, UNIX, Database, and LDAP in the enterprise. The privileged account management service 108 functionality can be extended and customized actions can be performed using JAVA based plug-ins. The privileged account management service 108 plug-ins can be designed to run in same server as the privileged account management service 108 or in an isolated sandbox Plug-in server 1004. Depending on the use case the administrator can decide to deploy the plug-in in the privileged account management service server 1002 or the external Plug-in server 1004.

The privileged account management service 108 has direct network access to manage these privileged accounts and target systems 1008. A plug-in running within the privileged account management service server 1002 application will also in turn get the network access. This may be advantageous for certain plug-in activities such as one that does password synchronization. But this may also be a security risk in some cases such as a plug-in which only needs to perform email notification and should not have network access to privileged accounts 1008. Isolating plug-in execution in a plug-in server 1004 which is separated by a firewall 1000 solves the security risk.

Misbehaving plug-ins may cause adverse effects such as consuming high amount of system resources, crashing the application, and denial of service. These problems are inherent with a custom plug-in running within the parent application. Isolated plug-in server in a different machine will ensure the parent application and resources are not affected.

Plug-ins in testing or staging phase may not be suitable for deployment in production environment. However, to perform testing, a complete environment may be created to deploy them and production may not be used directly. The plug-in server 1004 will be useful in cases where the plug-in can be deployed in external server 1004 and try it with production environment without adverse effects.

The privileged account management service Server Application is connected to target systems and manages the privileged accounts in them. The privileged account management service Server Application 1010 hosts internal plugin1 and internal plugin2 which has access to same resources as the privileged account management service Server Application 1010.

The privileged account management service Plug-in Application 1012 runs on an external server and is separated from the privileged account management service Server Application 1010 and Target Systems 1008 by a firewall 1000. The privileged account management service Plug-in Application 1012 hosts external plugin1 and external plugin2 which do not have access to the firewall protected resources.

The privileged account management service Server Application has the capability to invoke internal or external plug-ins.

The privileged account management service Server is used manage privileged accounts in production database systems. A notification plug-in provides capability to send emails and phone messages to the privileged account management service administrators on certain events such as end users accessing passwords of privileged accounts through the privileged account management service 108. This notification plug-in is developed and maintained outside of the privileged account management service 108 and production database administration group. Administrators would like to make use of this plug-in but for security purposes would not want to let the plug-in run with access to production databases. This plug-in can be deployed in the privileged account management service Plug-in server 1004 separated by a firewall 1000 without access to the production databases. The privileged account management service Server 1002 will be able to communicate with Plug-in server 1004 through restricted firewall access to invoke the plug-in and get the results.

Figure 11:
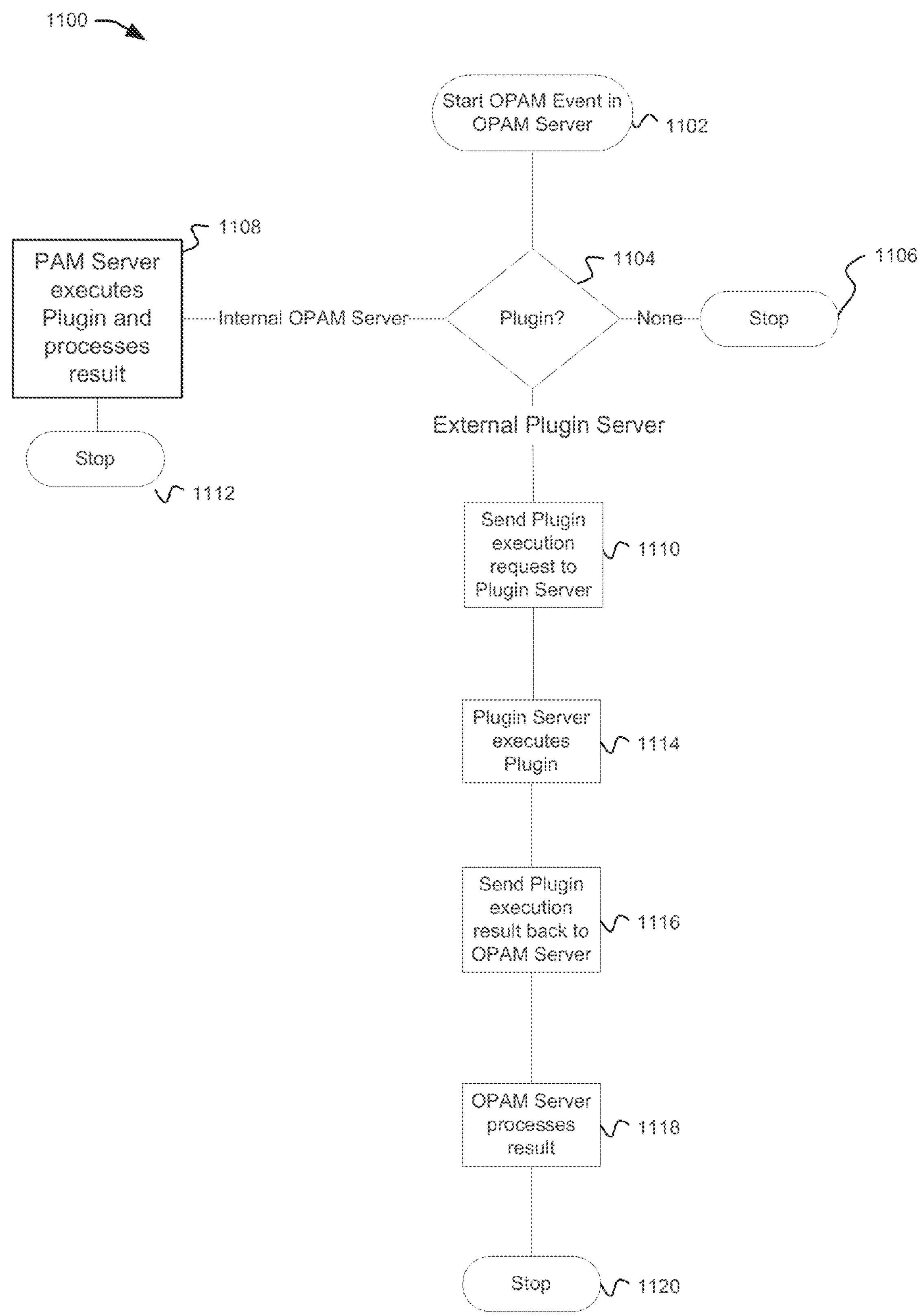
FIG. 11 is a simplified flow diagram illustrating at least some features of a session management server for an account management service with a plug-in framework implemented by one or more account management service computers described herein, according to at least one example.

FIG. 11 illustrates a simplified example flow diagram showing process 1100 for providing privileged account management services. The process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some aspects, the process 1100 of FIG. 11 may be performed by the one or more account management service computers 108 shown in FIG. 1. In particular, some or all of the process 1100 of FIG. 11 may be performed by the access management module 150 and/or the plug-in module 148 of FIG. 1. The process 1100 may begin by starting an event in the privileged account management server at 1102. At 1104, the process 1100 may determine whether there is an appropriate plug-in. If not, the process 1100 may end at 1106. However, if the process 1100 determines that there is a plug-in, the process 1100 may either access an internal server at 1108 or an external server at 1110. When an internal service is appropriate, the process 1100 may have the internal server execute the plug-in and process result and then the process 1100 may end at 1112. However, if an external server is to be used, the process 1100 may send the plug-in execution request to the plug-in server at 1110. At 1114, the process 1100 may instruct/enable the plug-in server to execute the plug-in. At 1116, the process 1100 may receive the plug-in execution result from the plug-in server. The process 1100 may then process the result at the internal server at 1118 and then end at 1120.

Figure 12:
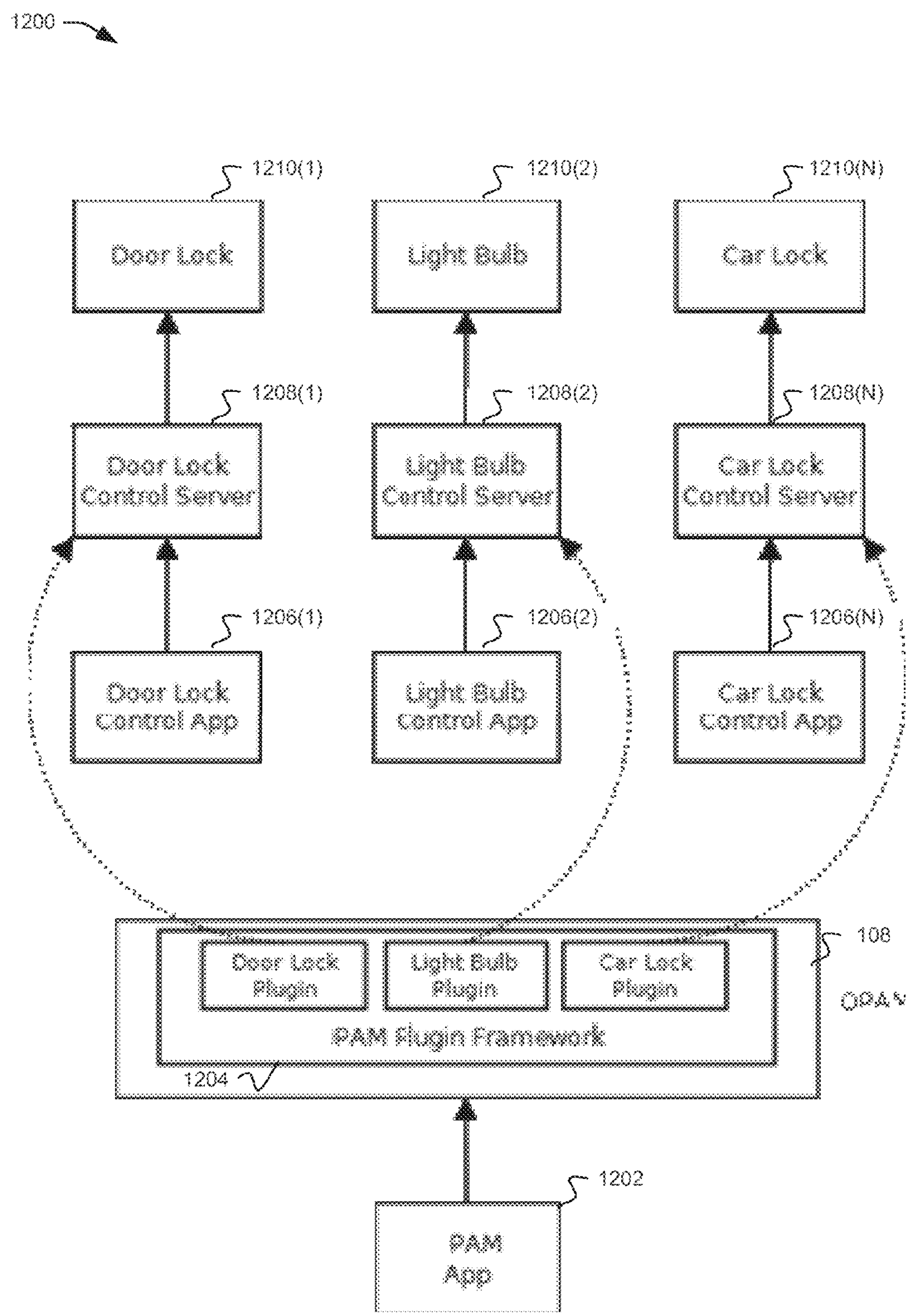
FIG. 12 is a simplified block diagram illustrating at least some features of an account management service with a plug-in framework implemented by one or more account management service computers for controlling network-connected objects described herein, according to at least one example.

FIG. 12 depicts a simplified architecture 1200 for illustrating how the account management service 108 of FIG. 1 may be configured to implement the control of network-connected objects. In some examples, a privileged account management application 1202 (e.g., a mobile application or other software configured to enable a user to access the account management service 108) may communicate with the privileged account management service 108. As noted above, the account management service 108 (also referred to as a "privileged account management service") may include a plug-in framework 1204 with one or more implemented plug-ins (e.g., the door lock plug-in, the light-bulb plug-in, and/or the car lock plug-in). Additionally, in some examples, there may exist specific control applications 1206(1)-(N), collectively control applications 1206. Each control application 1206 may directly correspond to a control server 1208(1)-(N), collectively control servers 1208. Additionally, each control server 1208 may be configured to control one or more networked connected objects 1210(1)-(N), collectively network-connected objects 1210. In one particular example, a door lock control application 1206(1) may be configured to send instructions to the door lock control server 1208(1) that can effectively unlock the door lock 1210(1). Alternatively, the door lock plug-in may be configured to provide the instructions to the door lock control server 1208(1) to unlock the door 1210(1). As such, a user can unlock the door 1210(1) or access any other network-connected object by utilizing the corresponding control application 1206(1) or the plug-in framework 1204.

As our world becomes more connected recent advances allow for physical things to be both (1) network accessible and (2) respond to/expose APIs (application programming interfaces). Thus controlling these devices requires backend server infrastructure to monitor and control the behavior of these devices. Since the behavior of these devices can have adverse impacts (ex. exposing valuable physical items to risk via an unlocked door or causing blackouts via burnt/blown out bulbs) remote access to these devices are privileged and must be restricted.

Since multiple vendors are introducing vastly different "Network-connected Things" (NCTs) that rely on different backend control systems, the same high level problem of privileged access is solved independently by each vendor. The efficacy of each solution varies depending on the implementation and often the core competency of the vendor is not security.

The privileged account management service is a product that focuses on privileged access as a core competency. Its plug-in framework allows privileged access to these devices to be controlled via the privileged account management service.

An end-user facing NCT Control App calls out to an NCT Control Server. The server handles both authentication and authorization in addition to controlling the NCT. Properly authentication and authorized operations that control the NCT are passed on to the NCT for action.

In addition to the proliferation of solutions to the same problem, this also leads to multiple end user facing applications (ex. Door Lock Control App, Light Bulb Control App and Car Lock Control App).

Instead the privileged account management service plug-in framework allows for the same Privileged Access Control mechanism to be leveraged across all NCTs while exposing a single end-user facing application.

In such a model, NCTs are modeled as the privileged account management service resources with associated grants and usage policies. An appropriately authenticated and authorized end-user is able to request access to the NCT resource from the privileged account management service via the end-user facing privileged account management service App. This in turn invokes an NCT specific plug-in that communicates with the NCT Control Server. The NCT Control Sever pushes control operations to the NCT to allow it to be accessed by the end user requesting access via the privileged account management service.

Figure 13:
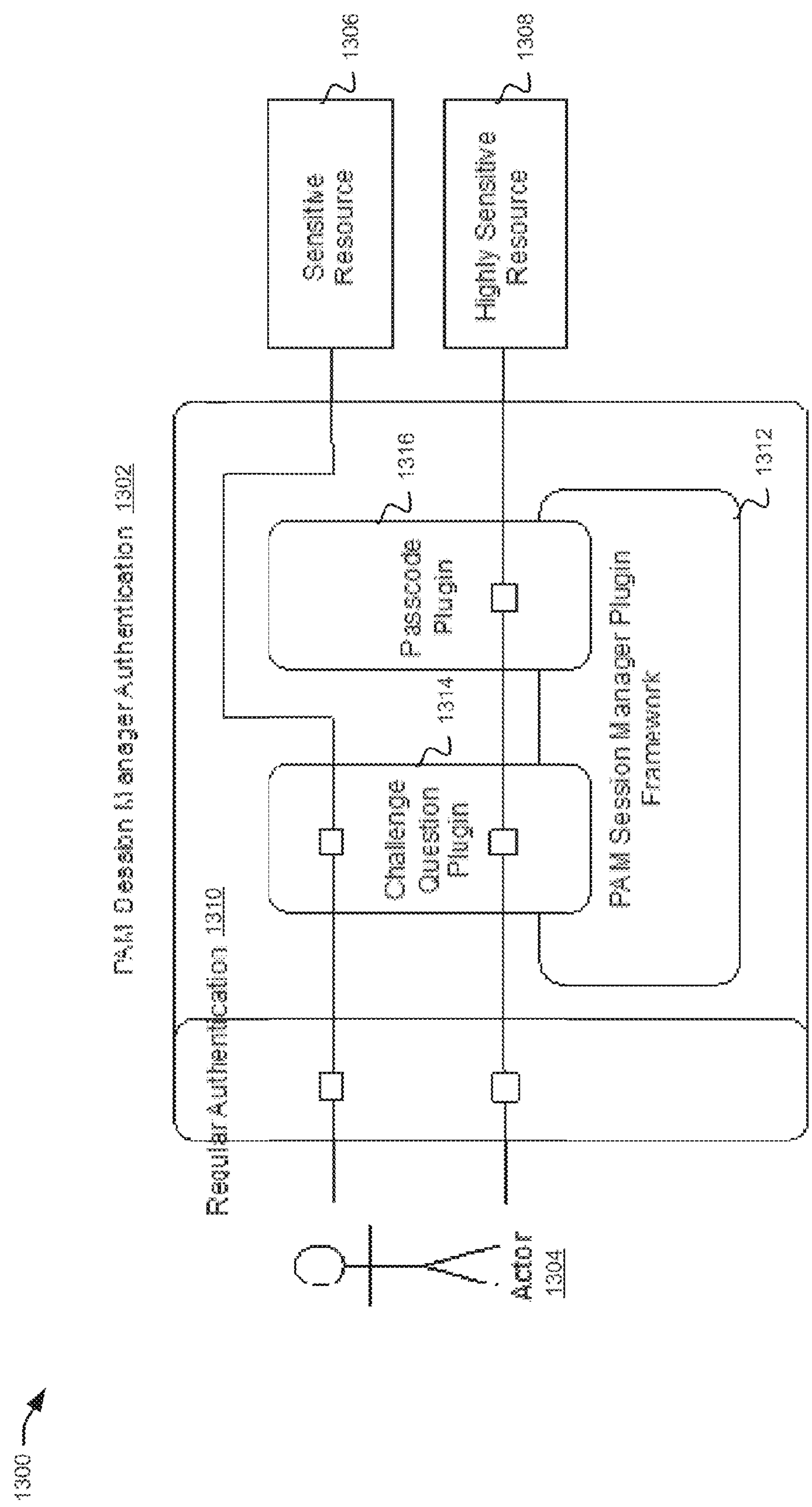
FIG. 13 is a simplified block diagram illustrating at least some features of a session management authentication service implemented by one or more account management service computers described herein, according to at least one example.

FIG. 13 depicts a simplified architecture 1300 that illustrates features of the step-up authentication described above. In some examples, a privileged account management session manager authentication module 1302 (e.g., implemented by the session module 156 of FIG. 1) may be configured to manage authentication of an actor 1304 attempting to access one or more secure resources (e.g., of a target computing system/account/resource). The secure resources may include, but are not limited to, a sensitive resource 1306 and/or a highly sensitive resource 1308. Further, in some examples, regular authentication 1310 may apply regardless of the resource and may include requesting log-in information from the actor 1304. However, in some examples, a plug-in framework 1312 may be capable of implementing one or more step-up authentication procedures and/or workflows. For example, if the actor 1304 is attempting to access the sensitive resource 1306, the plug-in framework may identify that a challenge question may be required based at least in part on the specific plug-in associated with that resource 1306 or other factors. As such, the actor 1304 may be asked the challenge question via the challenge question plug-in 1314. Further, if the actor 1304 is attempting to access the highly sensitive resource 1308, the plug-in framework may identify that the challenge question should be asked as well as a passcode may be required. In this case, a passcode plug-in 1316 may implement a workflow that implements instructions for requesting a passcode from the actor 1304 prior to giving the actor 1304 access to the highly sensitive resource 1308.

Critical resources or operations requiring a high level of security might need the presence of two authorized people at all times. This prevents accidental or malicious actions by a single individual. This practice is used in securing nuclear weapons launches or access to highly confidential laboratories. Some banks require two people with two different keys to access the vaults.

The privileged account management service session manager wants to extend this functionality to sessions in privileged session management. During a session, two authorized users must always be present at all the times. If at any time any user logs out, the session is terminated. Suppose Alice and Bob are two users who have been granted access to a privileged resource. If any action needs to be performed on the resource, flow would be:

Alice logs in and tries to initiate the session; session manager would make Alice wait till Bob logs in as well and initiates the session. (Vice-versa).

Once both are logged in, the session starts. Both the users would see the same screen. All the actions performed by any of them are visible to both of them.

If any of the user logs out, the session is terminated.

If a user goes malicious, it allows the other user to terminate the session immediately preventing any further damage.

The privileged account management service session manager can support variants of the two-man rule:

Both the users need not have the same privileges for the resource. One of them could be a mere observer or someone with super user privileges—though both still need to be present for the session to proceed.

A session can be suspended (instead of being terminated) when one of the user logs out, but it resumes when that user logs back in.

Though actions performed are visible to both, it might be possible for the observing user to miss some malicious activity. The privileged account management service can detect those actions and send an alert to the other user in the shared screen. The logic to detect such actions and the form of alerts can be encoded into plugins which can be plugged into the privileged account management service session manager's plugin framework.

The privileged account management service's Session Manager can allow users to access privileged resources through sessions, without exposing the privileged credentials ever to the users. In a traditional privileged access system, once a user is authenticated, he can establish a session with a granted resource. Once the user is inside the session, his abilities are fixed for the duration of the session. Though useful, these systems lack the temporal and contextual granularity of access control that some of the highly sensitive resources might require.

You may have highly sensitive resources where simple authentication would not be sufficient. It would be desirable to have additional layers of authentication which might not be—"one size fits all." The additional authentication required would depend on the specifics of the resource—location, type of resource, or the time at which the user is trying to access the resource or other contextual information like the user's group memberships. The privileged account management service Session Manager Plug-in Framework allows the inclusion of custom authentication logic during session initiation. Thus, when the privileged account management service User tries to start a session to access the resource custom authentication logic can be executed.

As an example, an organization might have some resources that are very critical, and then other resources that do not have the same level of sensitivity. For the former, it might be desired that the user is required to input a onetime pass code that he receives on SMS or generated by a hardware key and for the latter, couple of challenge questions might be sufficient. Two session manager authentication plugins—Passcode plugin and Challenge question plugin, could be written, which get invoked depending on the type, location or other relevant attributes that determine the sensitivity of the resource being accessed. The privileged account management service Session manager plugin framework allows chaining of authentication plugins, so multiple customizable layers of authentication can be added. In this example, for highly sensitive resources, both challenge question authentication and passcode authentication can be run and for others, just the challenge question authentication.

Similarly, an organization might have normal work hours from 9 AM to 5 PM. Any access after the normal work hours may require additional authentication logic or an alert be sent to the administrators.

Another example could be; John is a member of UNIX Maintenance group and Michael is a member of UNIX Administrators group. Access to a UNIX system has been granted to both these groups. When John (or any user who is a member of the maintenance group), tries to initiate a session to that UNIX system; he could be asked to additionally input a service request number whereas Michael would just go through the regular authentication.

For a sensitive resource, it might be possible that certain actions be allowed during normal work hours, but not otherwise. In traditional systems, once the user is inside a session, unless he terminates a session, he would continue to perform critical operations outside the normal work hours. The privileged account management service's session manager intends to solve this problem. At the time of grants, access to resources is determined by the policy that applies to the grant. The privileged account management service session manager adds a temporal component to the grant. A white list or blacklist of actions can be specified with the mapping to the time periods. In essence, the actions he can perform while being inside the session would depend on time.

The privileged account management service session manager's authorization capability can be extended through its plugin framework, plugins can be written to add custom authorization logic which can be applied at run time during the session. For example, within the session certain actions might require an approval before proceeding. Using the privileged account management service plugin framework, one can add a workflow plugin which upon invocation of certain actions waits for the approval before that action can proceed. User can continue to perform other actions as is.

Traditionally a grant in a Privileged Access Control system grants access to a resource in perpetuity. That is, once granted the grantee is able to access and use that resource at will.

As described, a properly authenticated and authorized privileged account management service user can request access to a resource via the privileged account management service. Access to this resource is controlled by the privileged account management service.

The flow for such an interaction takes the following order:

The privileged account management service User requests access to Resource from the privileged account management service.

The privileged account management service authenticates the privileged account management service User and determines if he is allowed to access the Resource being requested based on pre-defined policies.

If the privileged account management service User is authorized to access the requested Resource then access to the Resource is granted.

While this flow works for many use cases, it doesn't work for a specific set of use cases. In particular, the case of controlling emergency access to privileged resources. For example, consider the case of a fire extinguisher in the building. It is desirable that everyone has access to it in case of an emergency. However, the extinguisher shouldn't be used casually since it must be available during an emergency. Thus, to ensure that it is only used during emergencies a disincentive—in the form of a loud alarm that goes off when the glass is broken to extract the fire extinguisher—is in place. Thus, if you use it when you shouldn't be, then society will punish you for doing so.

In privileged account management, managing emergency access is a challenging problem. Certain system administrators may not need access to sensitive systems on a regular basis. However, during emergency situations you might want them to have access. When an emergency occurs, granting them access may not be feasible. But, if they were already granted access, it is difficult to prevent casual use of these sensitive systems.

The privileged account management service Plugin Framework allows for the inclusion of custom logic during resource checkout operations. Thus, even if a Resource is granted to a user of the privileged account management service, when the privileged account management service User tries to access the resource custom logic can be executed.

Thus, a "Workflow Plug-in" (sometimes referred to herein as "OWP") can be used to validate that the privileged account management service User trying to use the resource should be doing so. Like in the case of the Fire Extinguisher, if the goal is simply to provide a disincentive against casual use, then the OWP can be configured to send out an e-mail or an SMS to the entire company.

Alternatively, if during access an approval is required, the OWP could be configured to make a phone call to an Approver and trigger an I-V-R (Interactive Voice Response) based approval workflow. For example, when the privileged account management service User tries to use the Resource granted to him only for emergency use his manager might receive a phone call from the privileged account management service asking if the operation should be allowed.

Another case might be when the requirement is such that, access to the Resource is granted only when a Work Order or Support Ticket is logged against that machine/account. In such a case, the OWP could be configured to check against the Work Order or Support Ticket system to determine if a ticket associated with the Resource is open before providing access to the Resource.

Figure 14:
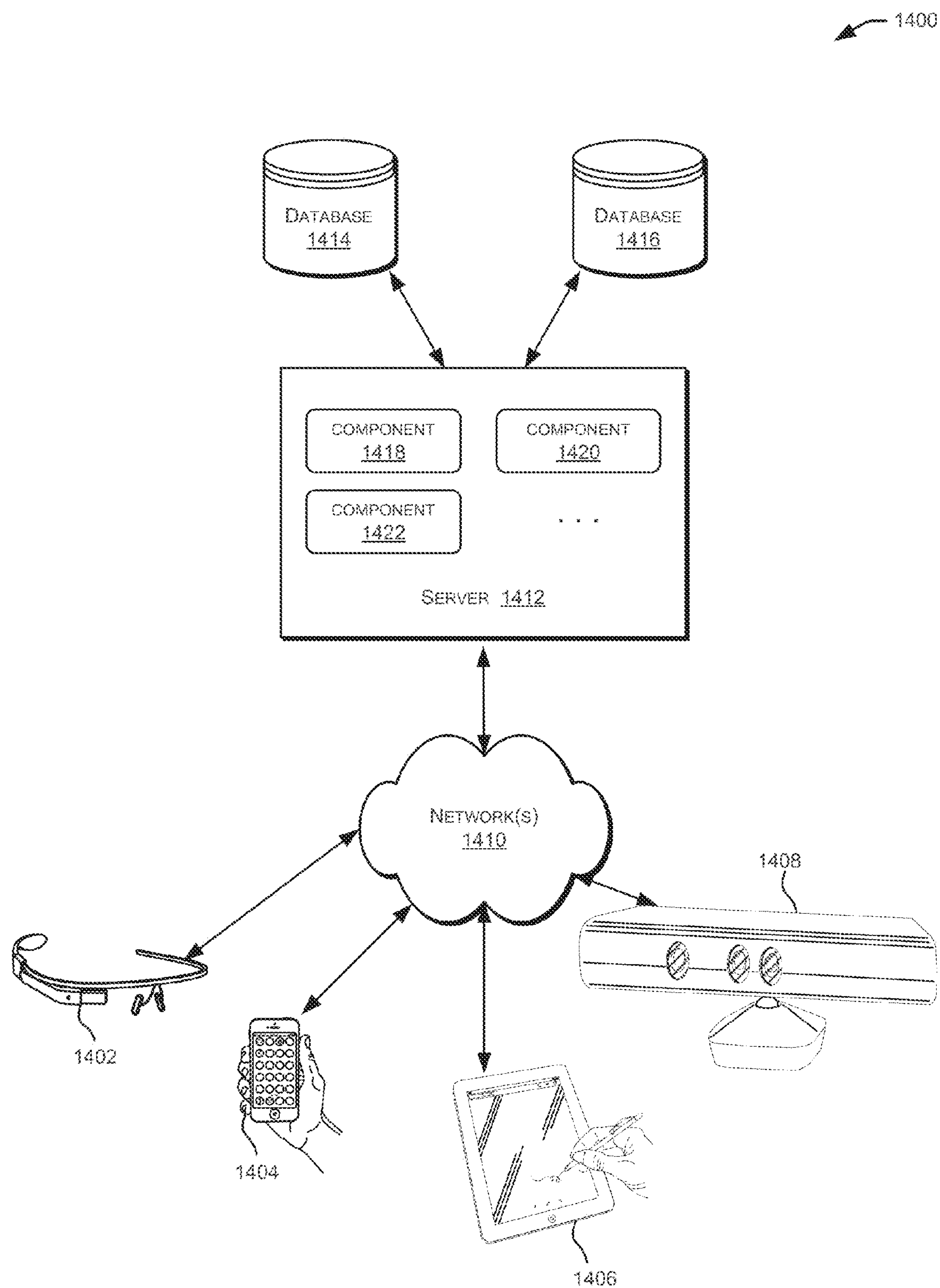
FIG. 14 depicts a simplified diagram of a distributed system for implementing some of the examples described herein, according to at least one example.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420, and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the FIG. is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 16, Palm OS, and the like, and being Internet, e-mail, short message service (SMS), Blackberry®, or other communication protocol enabled. The client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1402.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers. JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
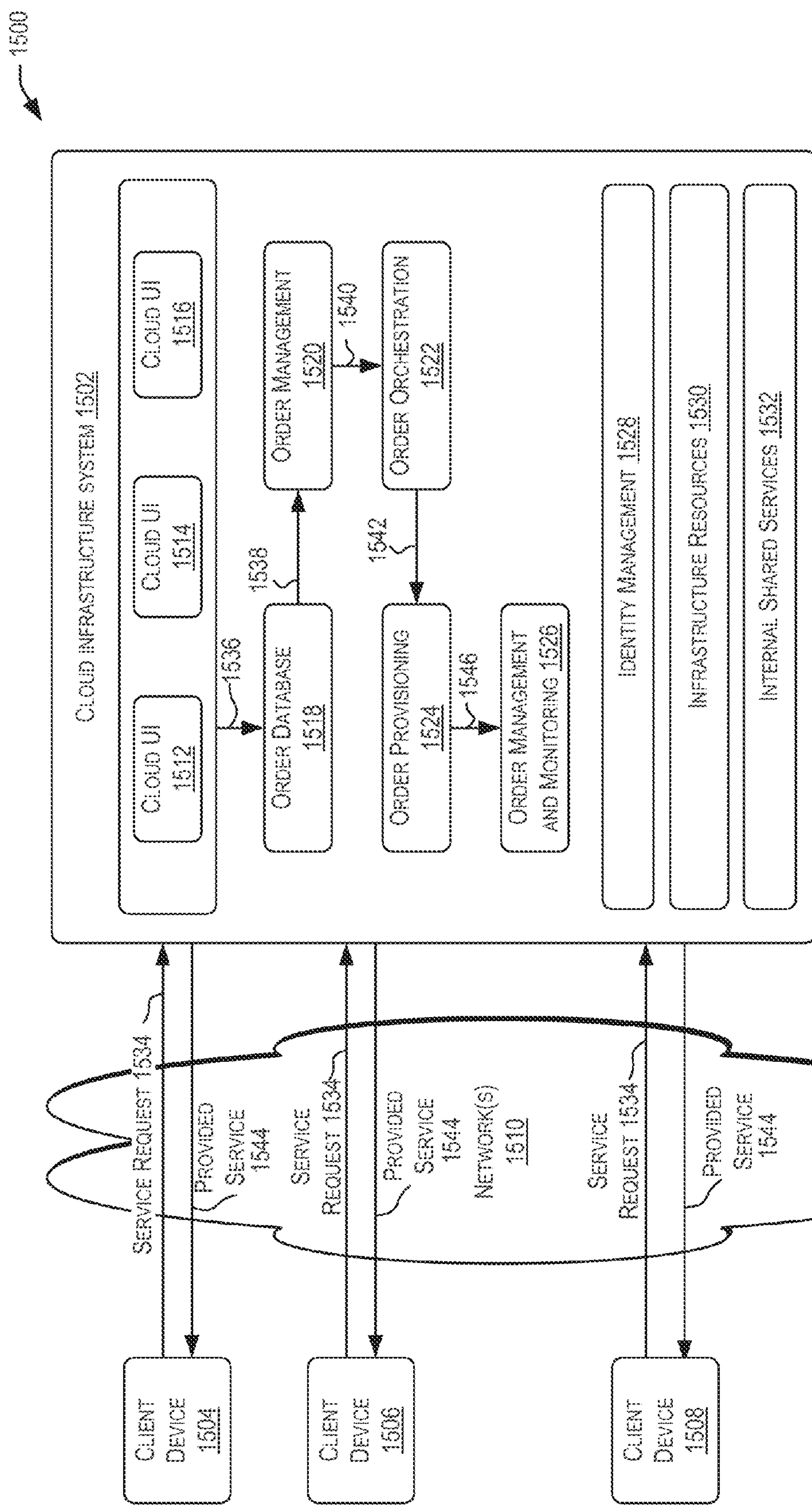
FIG. 15 is a simplified block diagram of components of a system environment by which services provided by the components of an embodiment system may be offered as cloud services, in accordance with some of the examples described herein, according to at least one example.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the FIG. may have other components than those depicted. Further, the embodiment shown in the FIG. is only one example of a cloud infrastructure system that may incorporate an embodiment of the disclosure. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage, and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1502, and the like.

In one embodiment, as depicted in FIG. 15, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514, and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506, and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
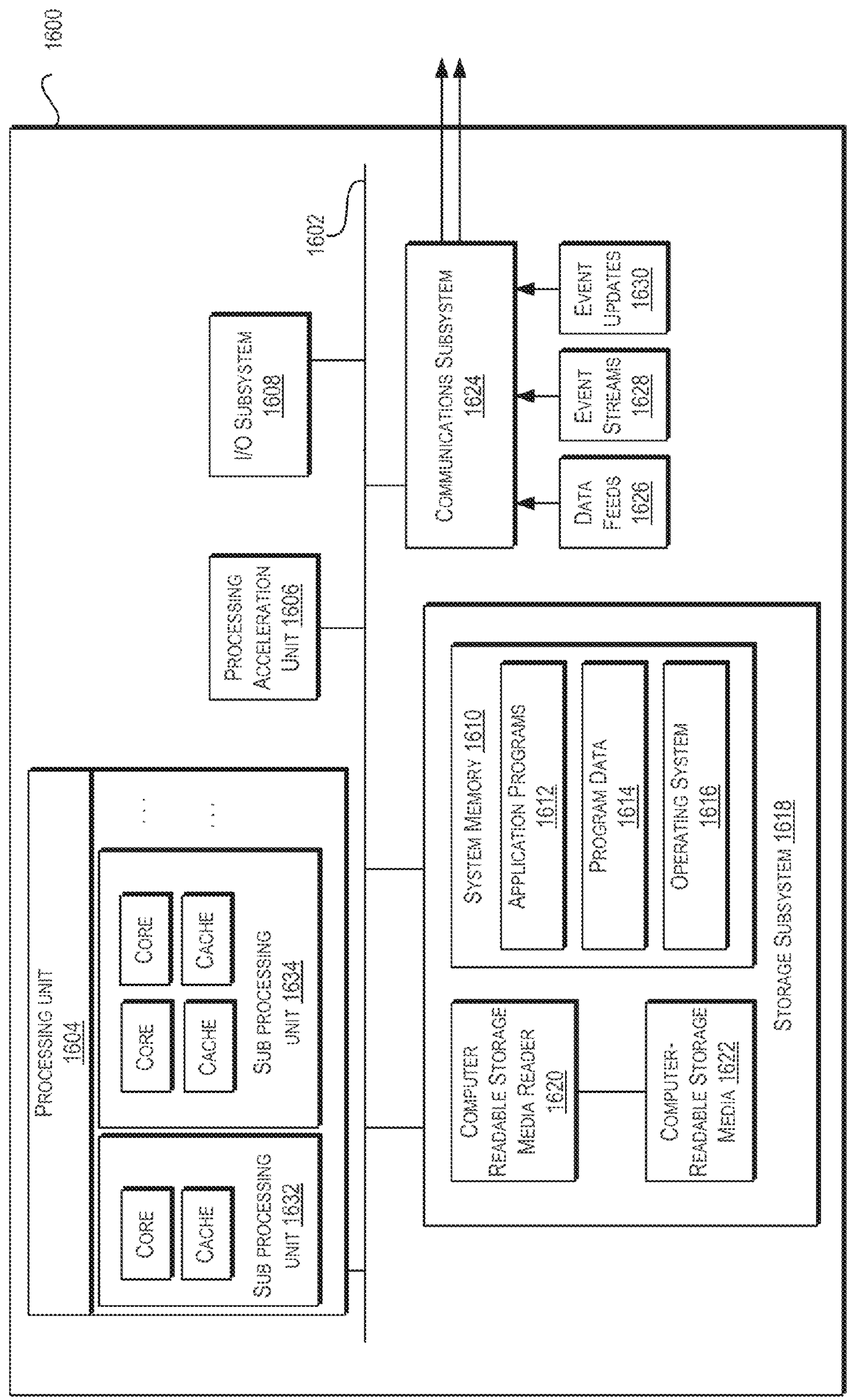
FIG. 16 illustrates an exemplary computer system, in which various embodiments of the present disclosure may be implemented in according with some of the examples described herein, according to at least one example.

FIG. 16 illustrates an exemplary computer system 1600, in which various embodiments of the present disclosure may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618, and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1402.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the FIG. is intended only as a specific example. Many other configurations having more or fewer components than the system depicted in the FIG. are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system, comprising:

a memory storing computer-executable instructions;

a privileged access management server that provides a privileged access management service configured with a plug-in framework for accessing at least a first secure resource and a second secure resource;

a plug-in server that is isolated from the privileged access management server by a firewall; and a processor of the privileged access management server configured to access the memory and execute the computer-executable instructions to at least:

receive, from an administrator associated with an administrative account that manages the secure resources, plug-in code for implementing a workflow that includes at least a step-up validation associated with a user attempting to access the first secure resource, the user associated with a user account;

receive, from the administrator, a request to deploy the plug-in code on the plug-in server that is isolated from the privileged access management server by a firewall in order to solve a security risk;

generate instructions for implementing the workflow on the plug-in server that is isolated from the privileged access management server based at least in part on the received plug-in code;

receive, from a computing device of the user, a log-in request including at least authentication information for authenticating the user with the privileged access management service;

securely log the user into the privileged access management service based at least in part on the authentication information;

provide access to the second secure resource after the user is securely logged into the privileged access management service and based at least in part on the authentication with the privileged access management service;

receive, from the computing device of the user, a request to access the first secure resource while the user is still logged into the privileged access management service;

based at least in part on the request to deploy the plug-in code on the plug-in server that is isolated by the firewall, transmit the instructions, to the plug-in server, to implement the workflow for performing the step-up validation to enable access of the user to the first secure by resource, the plug-in server configured to:

provide an automated message via a telephone call to a device of the administrator associated with the administrative account, the automated message identifying the request of the user to access the first secure resource, the administrative account being separate from the user account of the user and not part of another account with the user account of the user;

receive a selection, from the device of the administrator, of an option for allowing or denying the user to access the first secure resource, the selection made via a button of the device of the administrator; and transmit the option selected by the administrator to the privileged access management server;

receive, from the plug-in server, the option selected by the administrator; and provide access to the first secure resource based at least in part on the option selected by the administrator while the user is still logged into the privileged access management service.

2. The system of claim 1, wherein the access to the second secure resource is provided by checking out a password, to the user, for accessing the second secure resource or is provided by enabling a secure session, with the user, for accessing the second secure resource.

3. A non-transitory computer-readable storage memory storing a plurality of instructions executable by one or more processors, the plurality of instructions comprising:

instructions that cause the one or more processors to receive, from an administrator associated with an administrative account that manages the secure resources, plug-in code for implementing a workflow that includes at least a step-up validation associated with a user attempting to access a first secure resource, the user associated with a user account;

instructions that cause the one or more processors to receive, from the administrator, a request to deploy the plug-in code on a plug-in server that is isolated from a privileged access management server by a firewall in order to solve a security risk;

instructions that cause the one or more processors to receive, from a computing device of the user, a log-in request including at least authentication information for authenticating the user with a privileged access management service provided by the privileged access management server;

instructions that cause the one or more processors to securely log the user into the privileged access management service based at least in part on the authentication information;

instructions that cause the one or more processors to provide access to a second secure resource after the user is securely logged into the privileged access management service and based at least in part on the authentication with the privileged access management service;

instructions that cause the one or more processors to receive, from the computing device of the user, a request to access the first secure resource while the user is still logged into the privileged access management service;

instructions that cause the one or more processors to transmit, to the plug-in server, the instructions to implement the workflow for performing the step-up validation to enable access of the user to the first secure resource based at least in part on the request to deploy the plug-in code on the plug-in server that is isolated by the firewall, the plug-in server configured to:

provide an automated message via a telephone call to a device of the administrator associated with the administrative account, the automated message identifying the request of the user to access the first secure resource, the administrative account being separate from the user account of the user and not part of another account with the user account of the user;

receive a selection, from the device of the administrator, of an option for allowing or denying the user to access the first secure resource, the selection made via a button of the device of the administrator; and transmit the option selected by the administrator to the privileged access management server;

instructions that cause the one or more processors to receive, from the plug-in server, the option selected by the administrator; and instructions that cause the one or more processors to provide access to the first secure resource based at least in part on the option selected by the administrator while the user is still logged into the privileged access management service.

4. The non-transitory computer-readable storage memory of claim 3, wherein the plurality of instructions further comprise instructions that cause the one or more processors to generate instructions for implementing the workflow based at least in part on the received plug-in code.

5. The non-transitory computer-readable storage memory of claim 3, wherein the privileged access management service enables the administrator of the secure resources to update a policy associated with accessing the secure resources while the user is logged into the privileged access management service.

6. The non-transitory computer-readable storage memory of claim 3, wherein the plug-in code for implementing the workflow comprises a passcode plugin configured to request a passcode from the user or a challenge question plugin configured to request an answer to a challenge question from the user.

7. A computer-implemented method, comprising:

receiving, from an administrator associated with an administrative account that manages the secure resources, plug-in code for implementing a workflow that includes at least a step-up validation associated with a user attempting to access a first secure resource, the user associated with a user account;

receiving, from the administrator, a request to deploy the plug-in code on a plug-in server that is isolated from a privileged access management server by a firewall in order to solve a security risk;

generating instructions for implementing the workflow on the plug-in server that is isolated from the privileged access management server based at least in part on the received plug-in code;

receiving, from a computing device of the user, a log-in request including at least authentication information for authenticating the user with a privileged access management service provided by the privileged access management server;

securely logging the user into the privileged access management service based at least in part on the authentication information;

providing access to a second secure resource after the user is securely logged into the privileged access management service and based at least in part on the authentication with the privileged access management service;

receiving, from the computing device of the user, a request to access the first secure resource while the user is still logged into the privileged access management service;

based at least in part on the request to deploy the plug-in code on the plug-in server that is isolated by the firewall, transmitting the instructions, to the plug-in server, to implement the workflow for performing the step-up validation to enable access of the user to the first secure resource, the plug-in server configured to:

provide an automated message via a telephone call to a device of the administrator associated with the administrative account, the automated message identifying the request of the user to access the first secure resource, the administrative account being separate from the user account of the user and not part of another account with the user account of the user;

receive a selection, from the device of the administrator, of an option for allowing or denying the user to access the first secure resource, the selection made via a button of the device of the administrator; and transmit the option selected by the administrator to the privileged access management server;

receiving, from the plug-in server, the option selected by the administrator; and providing access to the first secure resource based at least in part on the option selected by the administrator while the user is still logged into the privileged access management service.

8. The computer-implemented method of claim 7, wherein the plug-in framework enables the administrator of the secure resources to update a policy associated with accessing the secure resources while the user is logged into the privileged access management service.

9. The computer-implemented method of claim 7, further comprising generating instructions for implementing the workflow based at least in part on the received plug-in code.

10. The computer-implemented method of claim 7, wherein the access to the second secure resource is provided by checking out a password, to the user, for accessing the second secure resource or is provided by enabling a secure session, with the user, for accessing the second secure resource.

11. The computer-implemented method of claim 7, wherein the plug-in code for implementing the workflow comprises a passcode plugin configured to request a passcode from the user or a challenge question plugin configured to request an answer to a challenge question from the user.

* * * * *

UNITED STATES PATENT AND TRADEMARK OFFICE

CERTIFICATE OF CORRECTION

PATENT NO. : 9,674,168 B2
APPLICATION NO. : 14/221203
DATED : June 6, 2017
INVENTOR(S) : Kottahachchi et al.

It is certified that error appears in the above-identified patent and that said Letters Patent is hereby corrected as shown below:

In the Specification

In Column 1, Lines 19-20, delete "FRAMEWORK - USAGE" and insert -- FRAMEWORK-USAGE --, therefor.

In Column 3, Line 2, delete "(e.g," and insert -- (e.g., --, therefor.

In Column 8, Line 67 and Column 9, Line 1, delete "user-/administrator-" and insert -- user/administrator- --, therefor.

In Column 25, Line 53, delete "servers." and insert -- servers, --, therefor.

Signed and Sealed this
Twenty-third Day of January, 2018

Joseph Matal

*Performing the Functions and Duties of the Under Secretary of Commerce for Intellectual Property and Director of the United States Patent and Trademark Office*